(12) United States Patent
Asai et al.

(10) Patent No.: US 6,271,933 B1
(45) Date of Patent: Aug. 7, 2001

(54) IMAGE READING APPARATUS

(75) Inventors: Hidehiko Asai, Toride; Keiju Kuboki, Yokohama; Satoru Kutsuwada, Kashiwa; Satoshi Kaneko, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/017,293

(22) Filed: Feb. 2, 1998

(30) Foreign Application Priority Data

Feb. 4, 1997 (JP) .................................................. 9-021505

(51) Int. Cl.$^7$ .............................. H04N 1/04; H04N 1/387
(52) U.S. Cl. ........................... 358/1.2; 358/451; 382/298
(58) Field of Search ................................ 358/1.2, 1.13, 358/451, 449; 382/298, 299

(56) References Cited

U.S. PATENT DOCUMENTS

| | | | |
|---|---|---|---|
| 4,771,473 | * 9/1988 | Sugiura | 382/298 |
| 4,905,096 | * 2/1990 | Moriya | 358/451 |
| 4,969,051 | * 11/1990 | Sasaki | 358/447 |
| 5,703,729 | * 12/1997 | Takeda et al. | 358/451 |

\* cited by examiner

Primary Examiner—Thomas D. Lee
(74) Attorney, Agent, or Firm—Fitzpatrick, Cella, Harper & Scinto

(57) ABSTRACT

An output signal of an optical reading line sensor is converted into a digital signal by an A/D converter and, thereafter, is shading corrected by a shading correction circuit, and is inputted to a magnification processing circuit through a selector. An optical reading scanning speed by the line sensor can be freely changed. There are a first mode for zooming a read image by changing the scanning speed of the line sensor, a second mode for zooming the read image by the magnification processing circuit, and a third mode for commonly performing the zoom by changing the scanning speed of the line sensor and the zoom by the magnification processing circuit. Any one of the modes is adaptively selected in accordance with a size of original and a reading resolution.

72 Claims, 16 Drawing Sheets

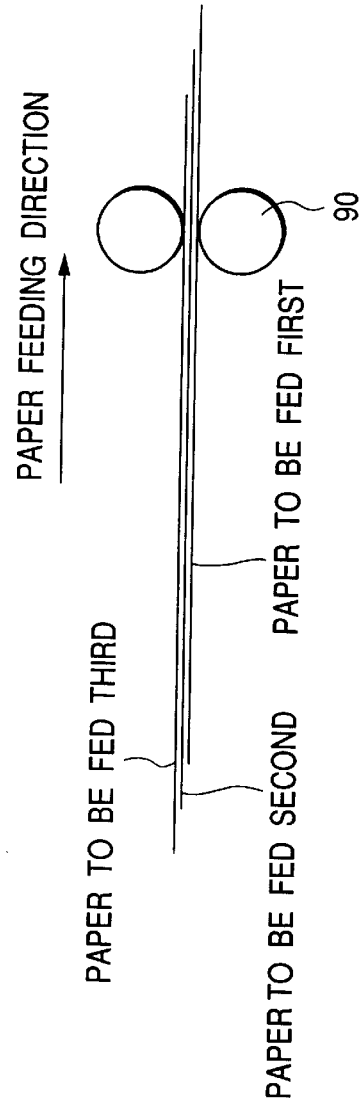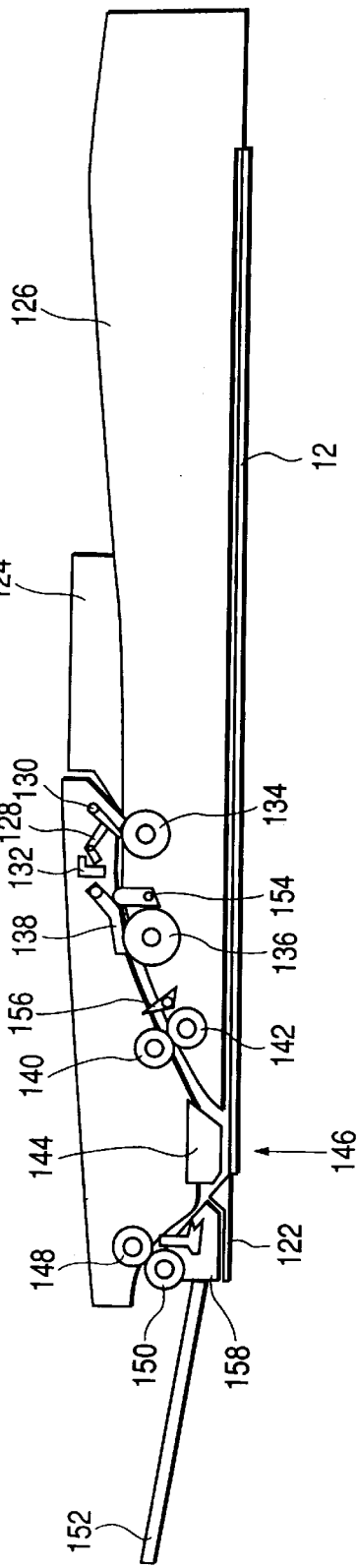

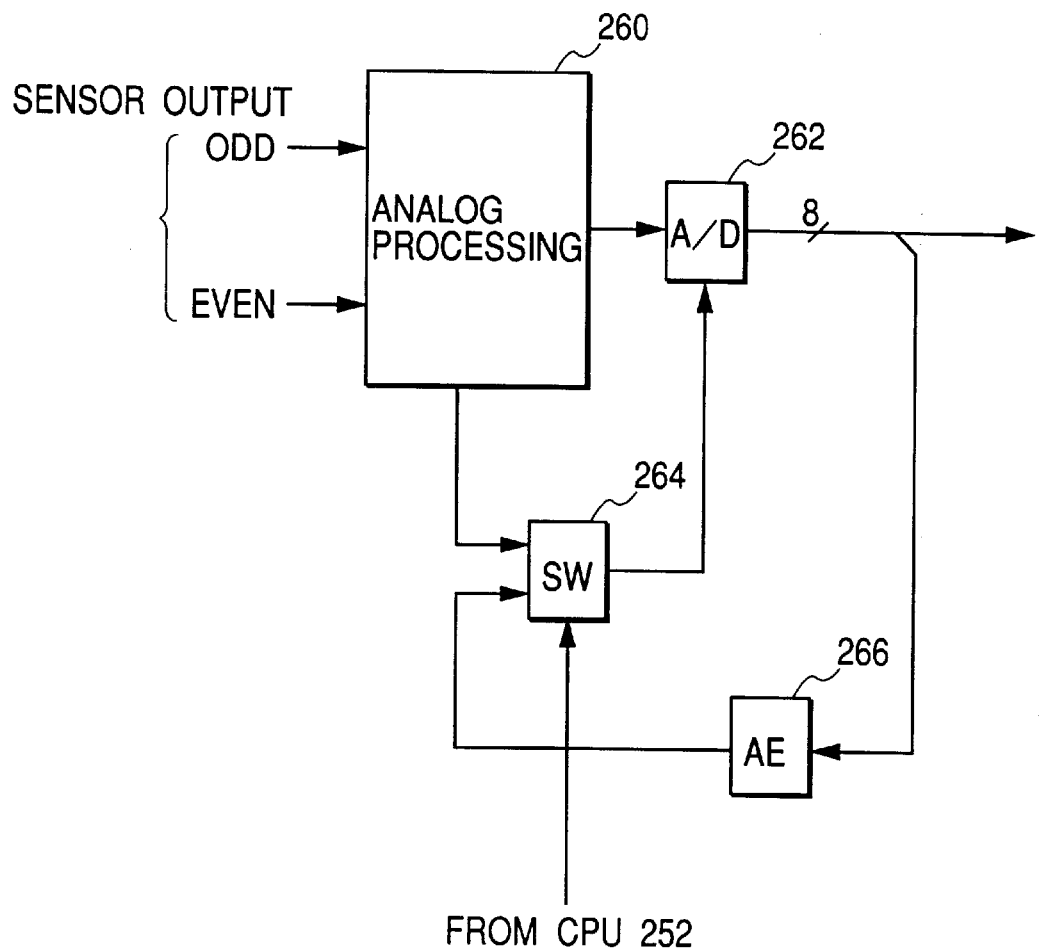

IMAGE READING APPARATUS

BACKGROUND OF THE INVENTION

1. Field of the Invention

The invention relates to an image reading apparatus.

2. Related Background Art

In case of reading an image on an original by a copying apparatus, a facsimile apparatus, or an image reading apparatus such as an image scanner or the like, there is an apparatus having a function to variably magnify (zoom, namely, enlarge or reduce) a size of image to be read. In case of zooming an image by such an image reading apparatus, such a zoom processing is accomplished by changing a reading main scanning speed at which an image reading unit for optically reading an original is relatively moved for the original.

However, in order to read the original image at a low resolution by using an image scanner having a high reading resolution, it is necessary to scan an optical system at a very high speed for the original. To move the optical system at a high speed as mentioned above, a long approach run distance is needed, resulting in an enlargement in size of the apparatus. When a motor is operated at a high speed, since the vibration increases, it becomes a factor of deterioration of an image quality such as fluctuation of the image or the like. Further, a high speed and expensive driving motor is also necessary.

SUMMARY OF THE INVENTION

It is an object of the invention to provide an image reading apparatus which can properly zoom an image.

Another object of the invention is to provide an image reading apparatus which can properly convert a pixel density.

According to an embodiment of the invention, there is provided an image reading apparatus comprising: reading means for reading an image; first magnifying means for changing a magnification of the image; second magnifying means for changing the magnification of the image by a method different from that of the first magnifying means; and selecting means for selecting either one of the first and second magnifying means.

With such a construction, the image can be properly zoomed.

According to another embodiment of the invention, there is provided an image reading apparatus comprising: reading means for reading an image; first density converting means for changing a pixel density per unit area of the image; second density converting means for changing a pixel density per unit area of the image by a method different from that of the first density converting means; and selecting means for selecting either one of the first and second density converting means.

With such a construction, the pixel density of the image can be properly converted.

The above and other objects and features of the present invention will become apparent from the following detailed description and the appended claims with reference to the accompanying drawings.

BRIEF DESCRIPTION OF THE DRAWINGS

FIG. 2 is a side elevational view showing an arrangement of transfer papers on an intermediate tray;

FIG. 3 is a side elevational view showing a construction of an ADF;

FIG. 6 is a schematic constructional block diagram of an A/D converting apparatus;

FIG. 8 is a diagram showing a filter matrix;

DETAILED DESCRIPTION OF THE PREFERRED EMBODIMENTS

Embodiments of the present invention will now be described in detail hereinbelow with reference to the drawings.

Figure 1:
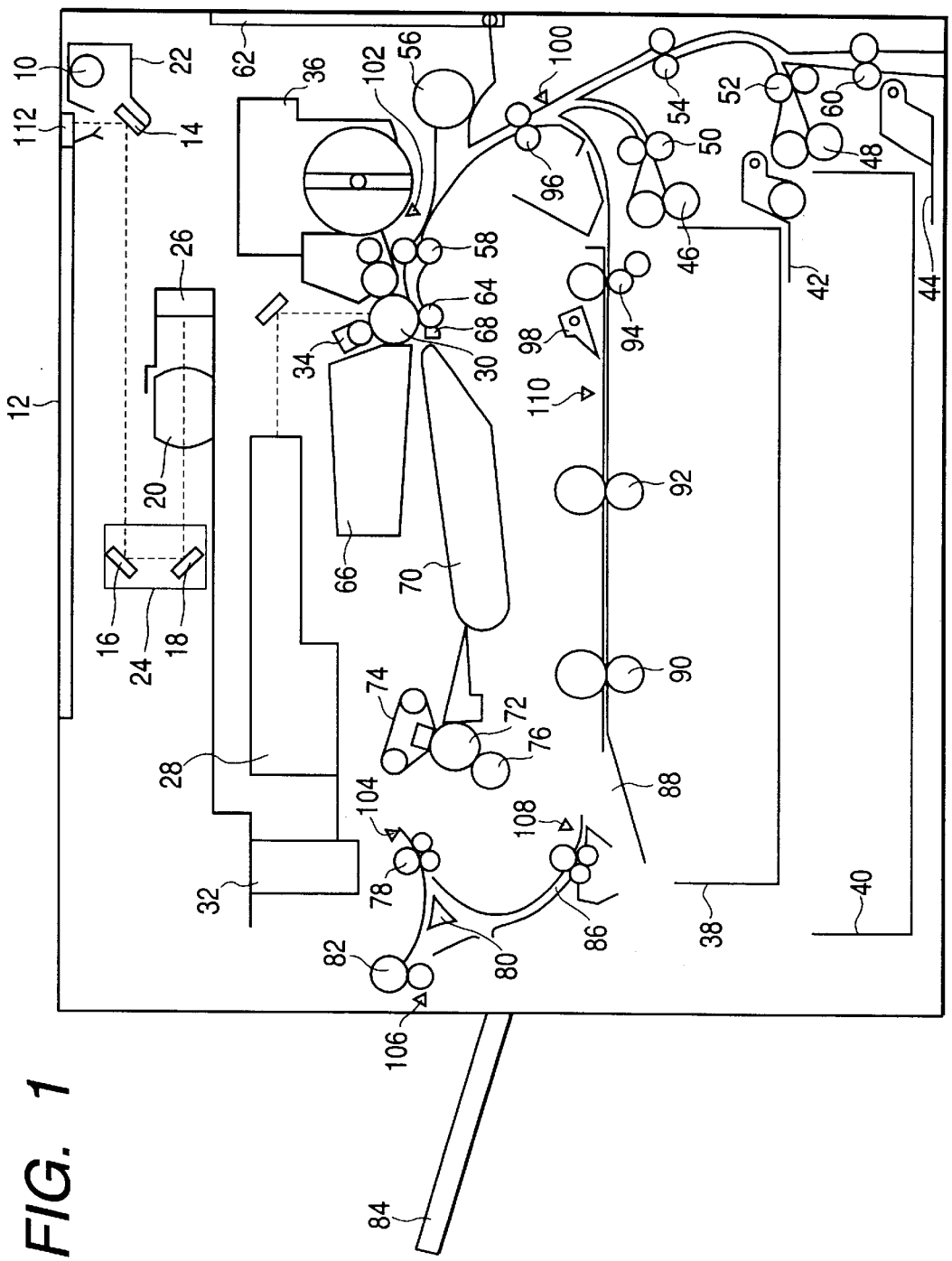
FIG. 1 is a side elevational view of a transfer paper conveyance and transfer system of a digital copying apparatus according to an embodiment of the invention.

FIG. 1 is a side elevational view of a mechanical portion of an embodiment of the invention applied to a digital copying apparatus.

An exposing lamp 10 is made up of a fluorescent lamp, a halogen lamp, or the like and irradiates an original on an original mounting glass (original base plate) 12 while moving in the direction perpendicular to the longitudinal direction. The reflected light from the original irradiated by the exposing lamp 10 is reflected by first, second, and third mirrors 14, 16, and 18 and reaches a lens 20. In this instance, a movable member 22 holds the exposing lamp 10 and first mirror 14 together and integratedly moves them. A movable member 24 for holding the second and third mirrors 16 and 18 moves at a speed of ½ of that of the movement of the movable member 22. Thus, the distance from the surface of the original to the lens 20 is always held constant.

An image on the original surface is formed on a photosensing surface of a CCD line sensor 26 through the mirrors 14, 16, and 18 and the lens 20. The CCD line sensor 26 successively converts a photosignal to an electric signal on a line unit basis. An output of the line sensor 26 is processed by a signal processing circuit (not shown) and is pulse width modulated (PWM modulated).

An exposure control circuit 28 drives a semiconductor laser on the basis of the PWM modulated image signal which is outputted from the signal processing circuit (not shown), thereby allowing a light beam to be irradiated onto the surface of a photosensitive drum 30 which is rotating at a constant speed. In this instance, the light beam is deflection scanned in parallel with the axial direction of the photosensitive drum 30 by using a polygon mirror. The exposure control circuit 28 is cooled by a cooling fan 32. As is well known, the residual charges on the photosensitive drum 30 are discharged by a preexposing lamp (not shown) before the light beam is irradiated, so that the surface of the drum is set to a uniform charging state by a primary charging device 34. Therefore, the photosensitive drum 30 receives the light beam while rotating, so that a corresponding electrostatic latent image is formed on the surface of the photosensitive drum 30. A developing device 36 visualizes the electrostatic latent image on the surface of the photosensitive drum 30 by a developing agent (toner) of a predetermined color.

Transfer papers (namely, papers to be fed) of a predetermined size are stacked in each of transfer paper stacking portions 38 and 40. Lift-up devices 42 and 44 lift up the transfer papers enclosed in the transfer paper stacking portions 38 and 40 to the positions of feed roller pairs 46 and 48. The roller pairs 46 and 48 are driven by a same motor (not shown) and selectively feed the transfer papers from one of the transfer paper stacking portions 38 and 40 by switching the roller rotating direction. The rollers of each of the feed roller pairs 46 and 48 are applied with a torque in the direction opposite to the paper feeding direction, thereby preventing an overlap feed of the transfer papers serving as recording media.

Feed rollers 50, 52, 54, and 56 feed the transfer papers from the transfer paper stacking portions 38 and 40 to a resist roller 58. In the embodiment, third and fourth transfer paper stacking portions can be further coupled to the lower portion of the stacking portions 38 and 40 and can be expanded. A pair of feed rollers 60 are provided so as to guide the transfer papers from the transfer paper stacking portion coupled to the lower portion to the feeding system mentioned above. When a manual insertion tray 62 is opened and the transfer paper is manually fed, the feed roller 56 feeds the manually fed transfer paper to the resist roller 58.

The resist roller 58 matches the edge of the electrostatic latent image formed on the photosensitive drum 30 with the edge of the transfer paper and feeds the transfer paper to the transfer position. A transfer charging device 64 transfers the toner image developed on the photosensitive drum 30 onto the fed transfer paper. After completion of the transfer, the toner remaining on the drum 30 is removed by a cleaner 66. Since a curvature of the drum 30 is large, the transfer paper after the end of the transfer is easily peeled off from the drum 30, by further applying a predetermined voltage to a charge removal needle 68, an adsorbing force between the drum 30 and the transfer paper is weakened, thereby enabling the paper to be easily separated.

The transfer paper separated from the photosensitive drum 30 is sent to a fixing roller 72 by a conveying belt 70 and the toner is fixed here. A heating portion 74 is constructed by a ceramic heater, a thin film, and two rollers. The heat of the ceramic heater is efficiently transferred to the fixing roller 72 through the thin film and heats (the toner on) the transfer paper. A cooling roller 76 radiates the heat accumulated in the fixing roller 72. A feed roller 78 is constructed by one large roller and two small rollers, feeds the transfer paper from the fixing roller 72, and corrects a curved state of the transfer paper.

A direction flapper 80 switches the conveying direction of the transfer paper in accordance with the operating mode. In a one-side recording mode as a mode for transferring once an image onto one side of the transfer paper, the direction flapper 80 selects a path directing from the feed roller 78 to a paper ejecting port. A pair of paper ejecting rollers 82 eject the transfer paper after completion of the image formation (printing) onto a paper ejecting tray 84.

In a both-side recording mode, during the paper ejecting operation by the pair of paper ejecting rollers 82 after completion of the development of the image on one side, the pair of paper ejecting rollers 82 are reversely rotated in a state where the rear edge of the transfer paper is left. At the same time, the direction of the direction flapper 80 is switched so as to allow the transfer paper to pass through a position below the direction flapper 80, thereby conveying the paper from the paper ejecting port to a feed roller 86. The feed roller 86 is constructed in a manner similar to the feed roller 78 and feeds the transfer paper to an intermediate tray 88 while correcting the curved state of the transfer paper. After that, the transfer paper is sequentially fed from the intermediate tray 88 to the foregoing transfer position in accordance with the order of feed rollers 90, 92, 94, and 96. The toner is transferred onto the back surface of the transfer paper and the paper is ejected to the paper ejecting tray 84.

In a multiplex recording mode, the transfer paper which passed through the feed roller 78 passes through the right side of the direction flapper 80 on the drawing by switching the direction of the direction flapper 80 and is sent to the feed roller 86. The feed roller 86 feeds the transfer paper to the intermediate tray 88. After that, the transfer paper is sequentially fed from the intermediate tray 88 to the transfer position in accordance with the order of the feed rollers 90, 92, 94, and 96. The toner is transferred onto the same surface as that in the previous transferring operation. The paper is ejected onto the paper ejecting tray 84.

In case of recording images to a plurality of transfer papers in the both-side recording mode or the multiplex recording mode, the first transfer paper (to be fed first) is stacked on the intermediate tray 88 in a state where it is rest by the stopped feed roller 90. When the second transfer paper (to be fed second) arrives, the feed roller 90 starts the rotation and sandwiches two transfer papers between the rollers. These two transfer papers are stacked on the intermediate tray 88 in a state where they are rest by the stopped feed roller 90. The third and subsequent transfer papers (papers to be fed third and at subsequent orders) are also similarly stacked on the intermediate tray 88. At this time, the front edge of the transfer paper overlapped later is overlaid so as to be shifted backward in the feeding direction as shown in FIG. 2.

When a desired number of transfer papers are stacked on the intermediate tray 88, the feeding operation from the intermediate tray 88 is started. During the conveyance of the transfer papers to the feed roller 94 by the feed rollers 90 and 92, a separation lever 98 drops between the edges of the first and second transfer papers, thereby allowing the first transfer paper to be fed to the feed roller 94 as it is. Thus, the first transfer paper is guided to the transfer position through the feed roller 96 and the image is transferred. After the second and subsequent transfer papers run over the separation lever 98, the feed rollers 90 and 92 are reversely rotated and the papers are returned onto the intermediate tray 88. By repeating the operations similar to those mentioned above, all of the transfer papers on the intermediate tray 88 are fed to the transfer position and the transfer is performed.

A plurality of paper detecting sensors 100, 102, 104, 106, 108, and 110 are arranged on the conveying path of the transfer papers and are used for detecting an error such as a paper jam or the like and matching an operation timing of each portion. The sensor 100 is arranged in front of the feed roller 96. The sensor 102 is arranged in front of the resist roller 58. The sensor 104 is arranged in front of the feed roller 78. The sensor 106 is arranged between the paper ejecting roller pair 82 and the paper ejecting port. The sensor 108 is arranged just after the feed roller 86. The sensor 110 is arranged in front of the separation lever 98.

A standard white board 112 is provided to obtain shading correction data to correct a variation (shading distortion) of an output level of the image signal which is caused due to unevenness of sensitivity of the line sensor 26 and unevenness or the like of a light amount of the light source 10. That is, prior to reading and scanning the original, the standard white board 112 is scanned a plurality of times by the line sensor 26 and white image data thus obtained is used as shading correction data, thereby correcting (shading correction) the unevenness of the level of the image signal obtained by scanning the original by the line sensor 26. Such a technique and a structure are well known.

FIG. 3 shows a cross sectional view of an automatic document feeder (ADF) which is used in the embodiment. An ADF 120 is detachable for the apparatus main body and has a structure such that it is closable for the original base plate 12 in a state where the ADF is attached to the main body. FIG. 3 shows a closed state and, in this state, the ADF 120 can operate. An abutting plate 122 is a member belonging to the main body side. The ADF 120 is electrically connected to the main body through a cable (not shown) and operates in an interlocking relation with the main body.

A side restricting member 124 is movable in the direction perpendicular to the feeding direction of the original, namely, in the direction perpendicular to the paper surface on the drawing. The side restricting member 124 is used to match the position with the width of original. When the operator puts the original onto an original mounting tray 126 in a state where the original surface is upside down, sets the side restricting member 124, and operates a copy start key, an original feed start signal is supplied from the main body to the ADF 120 via the cable and the original feeding operation is started.

When the paper is fed, a lever 128 depresses a roller pressing member 130 and lifts up a stopper 132 upward. A feed roller 134 rotates and the original on the original mounting tray 126 is fed. A separating roller 136 and a roller pressing member 138 separate the originals from the paper feed roller 134 one by one and feed them. A pair of resist rollers 140 and 142 feed the original from the separating roller 136 to a position between an original pressing member 144 and the original base plate 12. The original pressing member 144 has a shape so as to guide the original fed from the resist rollers 140 and 142 onto the original base plate 12. The original is properly pressurized by a spring member (not shown) so as to be closely come into contact with the original base plate 12.

The movable member 22 of the copying apparatus main body shown in FIG. 1 has been moved and stopped in a portion below a position 146 where the original is closely come into contact with the original base plate 12. The original to be fed by the ADF 120 is read and scanned here.

A pair of paper ejecting rollers 148 and 150 eject the original after completion of the reading and scanning operation onto a paper ejecting tray 152. Lever switches 154, 156, and 158 detect a passing state of the original during the original feeding operation. An error such as a paper jam or the like can be discriminated by an ON/OFF state of each of the lever switches 154, 156, and 158.

Figure 4:
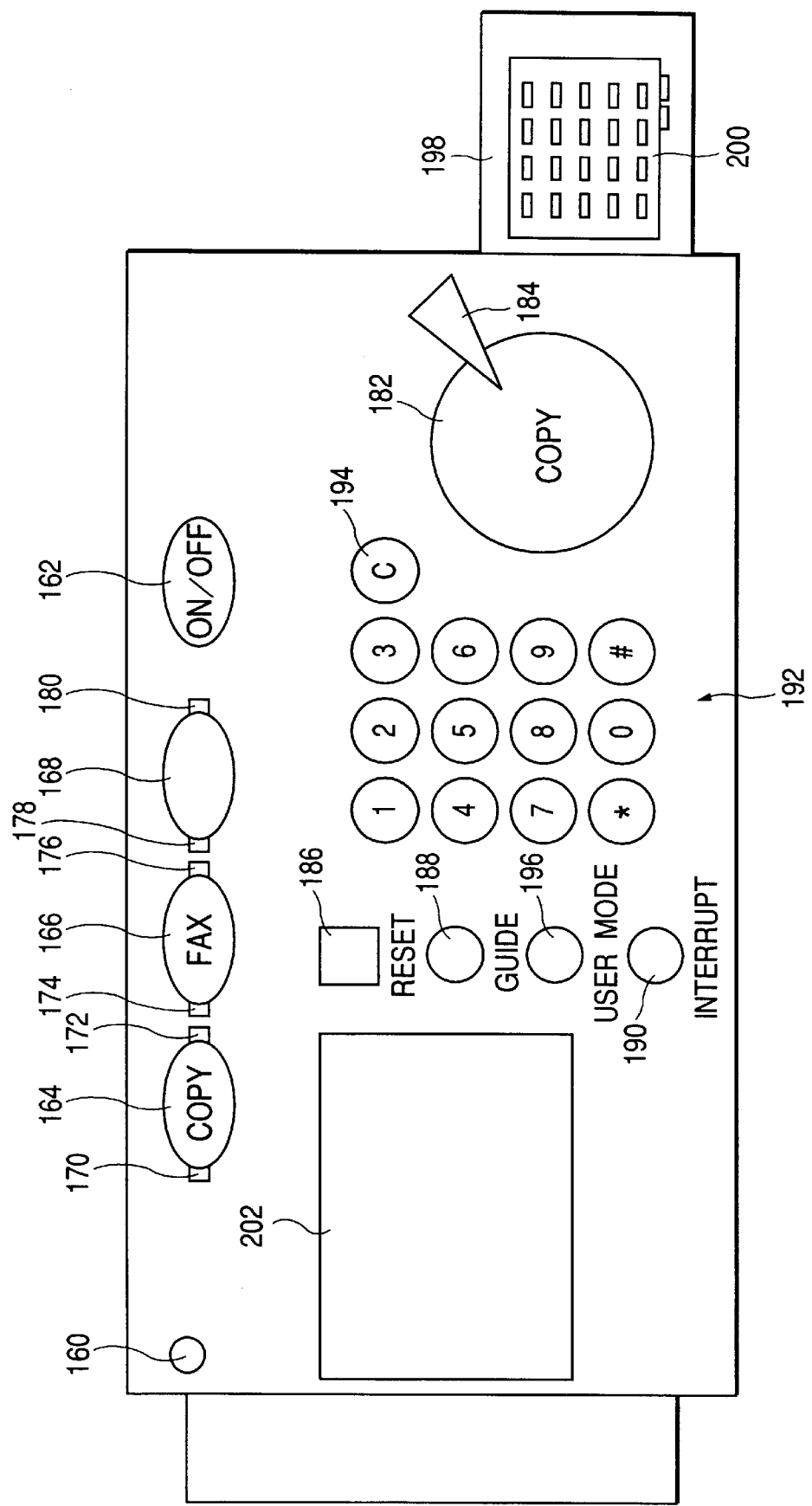
FIG. 4 is a diagram showing an external view of an operation unit.

FIG. 4 shows a key arrangement of a console unit of the digital copying apparatus of the embodiment. A power switch is arranged on the side of the main body. A main power lamp 160 is lit on when the power source is turned on. A preheating key 162 is used to set the ON/OFF of a preheating mode. A copy mode key 164 is used when selecting a copy mode from a plurality of functions. A facsimile (FAX) mode key 166 is used from the plurality of functions when selecting a facsimile (FAX) mode. When an optional apparatus such as a printer or the like is attached, an option mode key 168 is used to select an option mode from the plurality of functions.

Reference numerals 170, 172, 174, 176, 178, and 180 denote situation display lamps. The lamps 170 and 172 show a state during the copying operation. The lamps 174 and 176 show a state during the facsimile operation. The lamps 178 and 180 show a state during the optional operation. The lamps 170, 174, and 178 show that the apparatus is under the normal operation. The lamps 172, 176, and 180 show an error state. The lamp 170 flickers during the copying operation and is lit on when an image memory is used. The lamp 174 flickers during the facsimile transmission or reception and is lit on when the image memory is used. The lamp 178 flickers during the data reception and is lit on during the data transmission. The lamps 172, 176, and 180 flicker in correspondence to a paper jam state, no paper state, and no toner state with respect to the respective modes and are lit on in a failure state.

A copy start key 182 is used when instructing the start to copy. A stop key 184 is used to interrupt or stop the copying operation. A reset key 186 is used to return the operating mode to a normal mode during the standby state. A guide key 188 is used when the user wants to know each function. An interruption key 190 is used when the user wants to copy by interrupting during the copying operation. A ten-key 192 is used to input numerical values. A clear key 194 is used when the user wants to clear the input. A user mode key 196 is used when the user wants to change the fundamental setting items of the system.

Reference numeral 198 denotes a key device comprising 20 one-touch dial keys. The key device 198 is used when the user dials a partner telephone number by a one-touch operation in the FAX transmission. Reference numeral 200 denotes a cover made up of two plates. The cover 200 has a double structure of a shape in which each key portion of the one-touch dial keys 198 is punched. The first state in which two covers are closed, the second state in which only the first cover is opened, and the third state in which two covers are opened can be detected by a sensor switch (not shown). A function of each key of the one-touch dial key 198 is determined in combination with those three kinds of opening/closed states of the two covers. In the embodiment, therefore, the key device 198 is substantially equivalent to that total 60(=20×3) one-touch dial keys exist.

Reference numeral 202 denotes a touch panel comprising a combination of a liquid crystal display (LCD) panel and a touch sensor. An individual set picture plane is displayed every mode. Further, by touching the keys displayed, the user can set various functions in detail.

Figure 5:
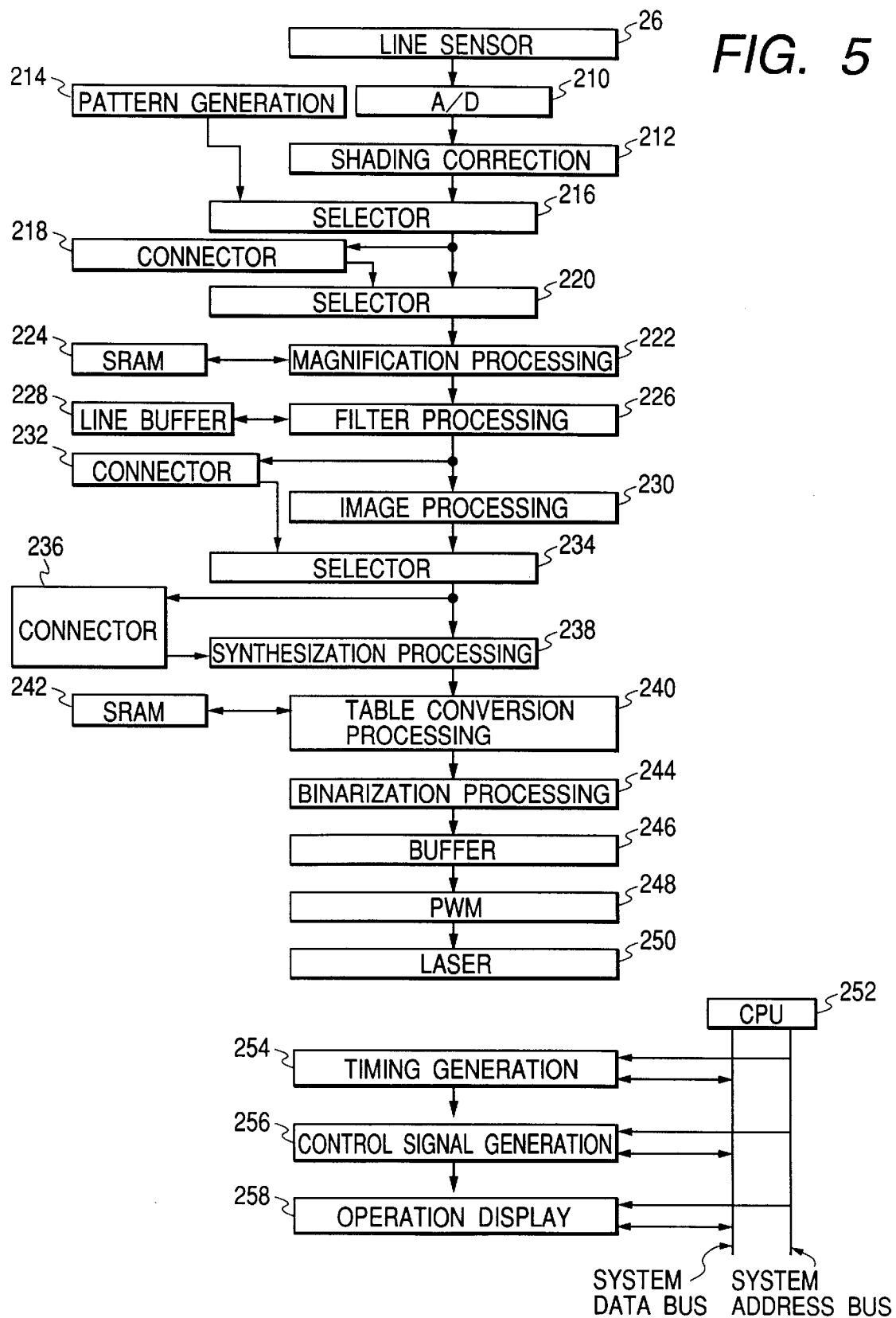
FIG. 5 is a schematic constructional block diagram of a signal processing unit.

FIG. 5 shows a schematic constructional block diagram of a signal processing system of the digital copying apparatus of the embodiment. The CCD line sensor 26 separately generates electric signals of one line of the original image with respect to two systems of odd pixels and even pixels. An A/D converting apparatus 210 converts an analog output signal of the line sensor 26 into a digital signal.

FIG. 6 shows a schematic constructional block diagram of the A/D converting apparatus 210. An analog processing circuit 260 clamps, gain adjusts, and samples and holds the output signals of two systems of "odd" and "even" of the line sensor 26 every system and, after that, integrates the resultant signals to one system by a switch processing, and outputs an integrated signal. An A/D converter 262 converts an analog output of the analog processing circuit 260 to a digital signal of 8 bits by using a reference voltage input from an analog switch 264 as a reference.

An AE circuit 266 is provided to control the reference voltage of the A/D converter 262 so as to make an A/D converter output of the other portion of the original approach a white level [FFh (hexadecimal number)].The analog switch 264 selects one of the predetermined reference voltage from the analog processing circuit 260 and the output voltage of the AE circuit 266 in accordance with a control signal from a CPU 252 and supplies as a reference voltage to the A/D converter 262. A driving signal generating circuit (not shown) supplies signals of a line unit such as a sync signal and the like and driving clocks to the line sensor 26, analog processing circuit 260, and A/D converter 262.

Figure 7A:
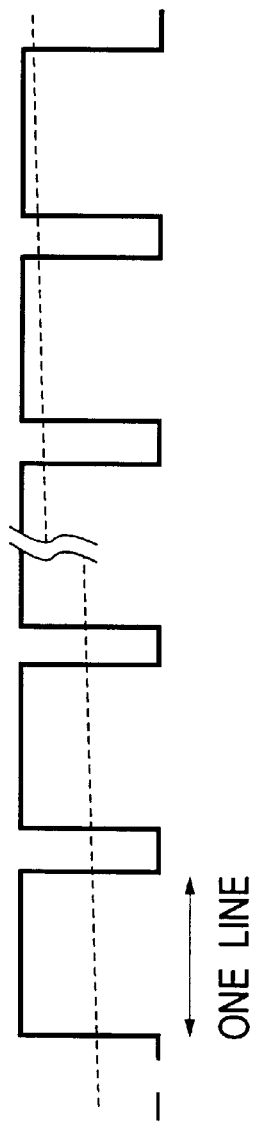
FIGS. 7A and 7B are waveform diagrams showing the AE operation.
Figure 7B:
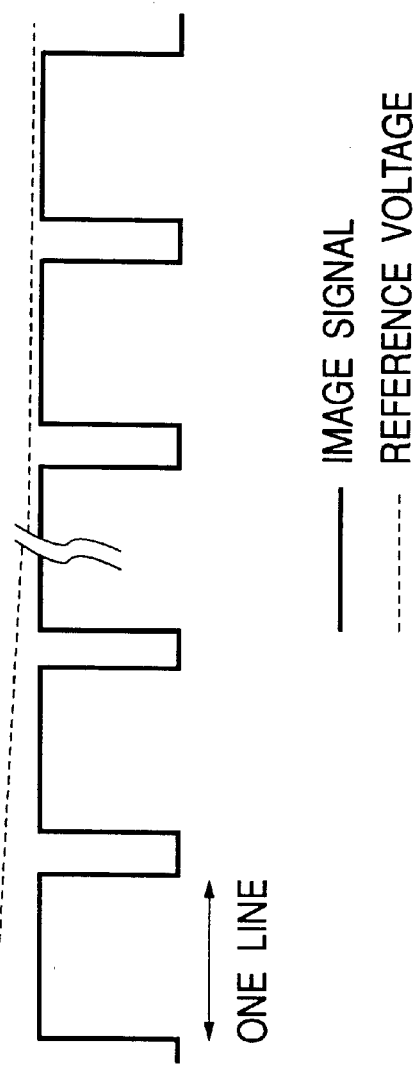

The AE circuit 266 controls the reference voltage value of the A/D converter 262 on the basis of an output of the A/D converter 262. Namely, when the output of the A/D converter 262 is equal to FFh, the AE circuit 266 raises the reference voltage output as shown in FIG. 7A in accordance with a first time constant. When the output of the A/D converter 262 is not equal to FFh, the AE circuit 266 drops the reference voltage output as shown in FIG. 7B in accordance with a second time constant. The first and second time constants are set to values corresponding to tens of lines so that the reference voltage output does not suddenly change due to a change in image signal.

In FIG. 5, a shading correction circuit 212 digitally corrects a variation in sensitivity of each photosensitive device of mainly the optical system and the sensor 26 which is included in the output data of the A/D converting apparatus 210 with regard to a black level and a gain. A pattern generator 214 generates various image patterns such as vertical ruled line, lateral ruled line, lattice stripe, gray scale, and the like for a function check after the shading correction circuit 212. A selector 216 selects one of an output of the shading correction circuit 212 and an output of the pattern generator 214 in accordance with a control signal from the CPU 252 and outputs.

A connector 218 includes terminals for an image input signal, an image output signal, a pixel clock signal, an image enable signal, and a sync signal. The terminal of the image output signal of the connector 218 is connected to an output of the selector 216 and the image input terminal is connected to a selector 220. The function can be expanded by connecting a new signal processing circuit to the connector 218. The selector 220 selects one of an output signal of the selector 216 and the signal from the connector 218 in accordance with a control signal from the CPU 252 and outputs.

A magnification processing circuit 222 executes a thin-out processing in the main scanning direction, a linear interpolation processing, a thin-out processing in the sub-scanning direction, an oblique character processing, a mirror image processing, a repeat processing, a return processing, or the like by using an SRAM memory 224, thereby zooming the image by electrically processing the image with respect to the main scanning direction and the sub-scanning direction.

In case of linear interpolation processing an output signal of the selector 220 with regard to the main scanning direction, this processing is executed by calculating pixel values from two adjacent pixels. However, when the magnification in the main scanning direction is equal to or less than 50%, a thin-out processing in the main scanning direction is executed as a preprocessing in order to prevent a moire or breakage of a thin line. In the preprocessing, with respect to the adjacent n pixels (n=2, 4, or 8), the maximum value or average value is outputted. The CPU 252 designates the value of n and the maximum value or average value.

The zooming in the sub-scanning direction can be realized by changing a scanning speed of the optical system such as exposing lamp, mirror, etc. or by changing a paper feeding speed to the original base plate 12 when the automatic document feeder (ADF) is used. However, in case of a small magnification exceeding a limit for realization of a high scanning speed of the optical system or a high paper feeding speed, the magnification processing circuit 222 executes a thin-out processing in the sub-scanning direction and reduces to a designated magnification. In the thin-out processing in the sub-scanning direction, a line buffer comprising the SRAM memory 224 is used and the maximum value or average value is outputted with regard to the n pixels (n=2, 4, or 8) which are neighboring between the lines. The CPU 252 designates the value of n and the maximum value or average value.

The functions of the oblique character processing, mirror image processing, repeat processing, and return processing can be realized by controlling a read address in the line buffer comprising the SRAM memory 224. The magnification processing circuit 222 forms a histogram from the output of the selector 220 by using the SRAM memory 224. A sampling interval and a sampling range in the formation of the histogram are determined by a timing signal which is generated from a timing signal generating circuit 254. The CPU 252 controls the timing signal generating circuit 254. The data of the formed histogram is used to decide a luminance density conversion table in an AE mode when a prescan is used.

A filter processing circuit 226 performs a filter processing to the signal after completion of the zoom processing, namely, to the output of the magnification processing circuit 222 on the basis of a mask size of 5 ×5 by using a line buffer 228. As shown in FIG. 8, there are six kinds (a to f) of coefficients constructing a filter of the filter processing circuit 226 and the coefficients existing at the positions which are symmetrical with respect to a point are set to the same value. The coefficients a to f satisfy the following relational equation.

$$a+4\times(b+c+d+f)+8\times e=1$$

By adjusting the coefficients of the filter processing circuit 226, the correction of the optical system and output system and the sharpness adjustment by the user are realized.

An image processing circuit 230 executes a mask processing or an inversion processing to an output signal of the filter processing circuit 226. A connector 232 has terminals for the image input signal, image output signal, image clock signal, image enable signal, and sync signal. The image output terminal of the connector 232 is connected to the output of the filter processing circuit 226. The image input terminal of the connector 232 is connected to one input of a selector 234. An output of the image processing circuit 230 is connected to the other input of the selector 234. The selector 234 selects one of the output signal of the image processing circuit 230 and a signal from the connector 232 in accordance with a control signal from the CPU 252 and outputs. The functions can be expanded by connecting a new signal processing circuit to the connector 232.

A connector 236 has terminals for the image input signal, image output signal, pixel clock signal, image enable signal, sync signal, address bus, data bus, and interruption signal. The image output terminal of the connector 236 is connected to an output of the selector 234 and the image input terminal of the connector 236 is connected to one input of a synthesization processing circuit 238. The output of the selector 234 is connected to the other input of the synthesization processing circuit 238. The functions can be expanded by connecting a new system to the connector 236.

The synthesization processing circuit 238 synthesizes the output (input A) of the selector 234 and the signal (input B) from the connector 236 in accordance with a control signal from the CPU 252 and outputs. There are six kinds of synthesization such as fitting synthesization, multiplex synthesization, mesh overlapping, transparent synthesization, "through" of the input A, and "through" of the input B and a desired synthesization kind is determined by a control signal from the CPU 252.

A method of each synthesization processing will now be described with reference to FIGS. 9A to 9G.

Figure 9A:
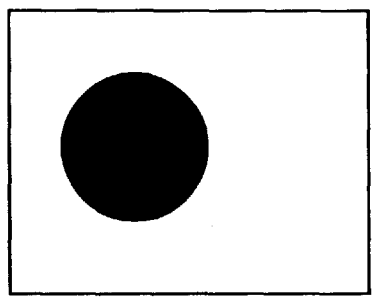
FIGS. 9A, 9B, 9C, 9D, 9E, 9F and 9G are diagrams showing examples of a synthesization processing of an image.
Figure 9B:
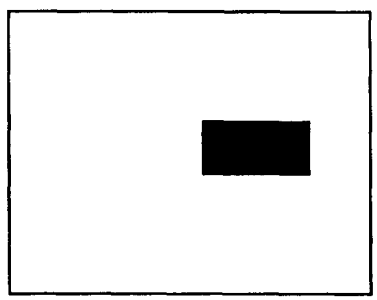
Figure 9C:
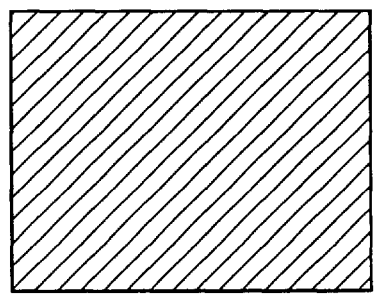
Figure 9D:
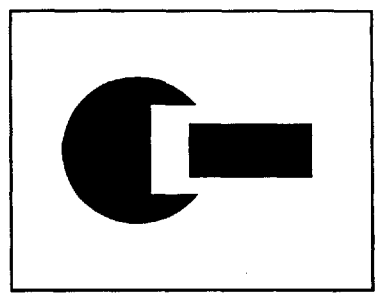

The fitting synthesization is a processing for cutting out a part of the image and fitting into another image and an example is shown in FIG. 9D. FIG. 9D shows an image obtained by cutting out a rectangular area around a rectangle shown in FIG. 9B and fitting into a circle shown in FIG. 9A.

Figure 9E:
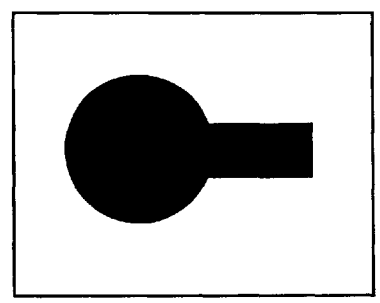

The multiplex synthesization is a processing for selecting an image of a higher density between two images and synthesizing the selected image and an example is shown in FIG. 9E. FIG. 9E shows an image obtained by multiplex synthesizing the images shown in FIGS. 9A and 9B.

Figure 9F:
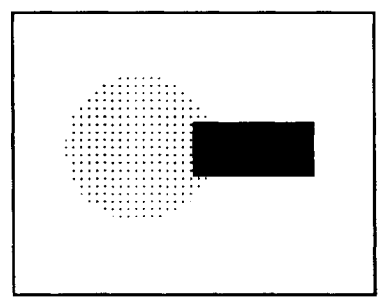

The transparent synthesization is a processing for replacing a pixel in which a density of one image is equal to or less than a predetermined threshold value by the other image and an example is shown in FIG. 9F. The image to be replaced can be allowed to have an effect such as transparency by decreasing the density by multiplying a predetermined coefficient. FIG. 9F shows an image obtained by synthesizing the images shown in FIGS. 9A and 9B so that the image of FIG. 9A is transparent for the image shown in FIG. 9B.

Figure 9G:
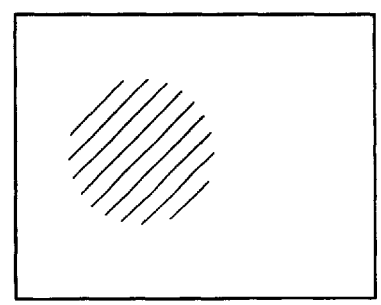

The mesh overlapping is a processing for replacing a pixel in which the density of one image is equal to or larger than a predetermined threshold value by the other image and an example is shown in FIG. 9G. FIG. 9G shows an image obtained by replacing a circle of a high density of the image shown in FIG. 9A by a pattern shown in FIG. 9C.

A table conversion processing circuit 240 table converts the output signal of the synthesization processing circuit 238 in accordance with data stored in the SRAM memory 242 connected. A binarization processing circuit 244 processes an output signal of the table conversion processing circuit 240 by a predetermined binarization method and outputs it or through-outputs the output signal of the table conversion processing circuit 240 without processing in accordance with a control signal from the CPU 252. In the binarization processing of the embodiment, one pixel is divided into two small pixels in the main scanning direction and each of the divided small pixels is expressed by a binary value, thereby improving a resolution in the main scanning direction. A buffer 246 buffers an output signal of the binarization processing circuit 244, thereby adjusting processing speeds of processing systems before and after the buffer 246 and a read-out start time of the image signal.

A PWM circuit 248 pulse width modulates a digital signal from the buffer 246 and outputs. Although the PWM circuit 248 has three kinds of modulating methods, a proper modulating method is determined and selected by the CPU 252 in accordance with the mode of the system.

Figure 10:
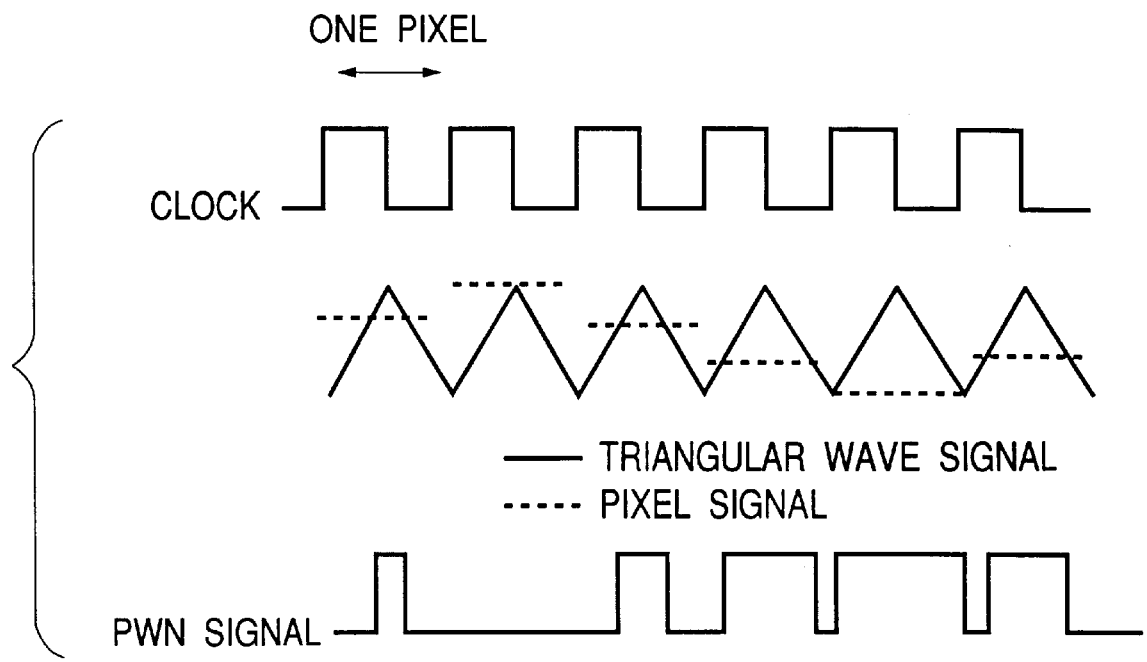
FIG. 10 is a waveform diagram showing the first example of a PWM modulation.

The first modulating method corresponds to a resolution priority mode. As shown in FIG. 10, pixel data shown by 8 bits is D/A converted and sampled and held, the resultant data is compared with a triangular wave signal of one pixel period, and a PWM signal is outputted.

Figure 11:
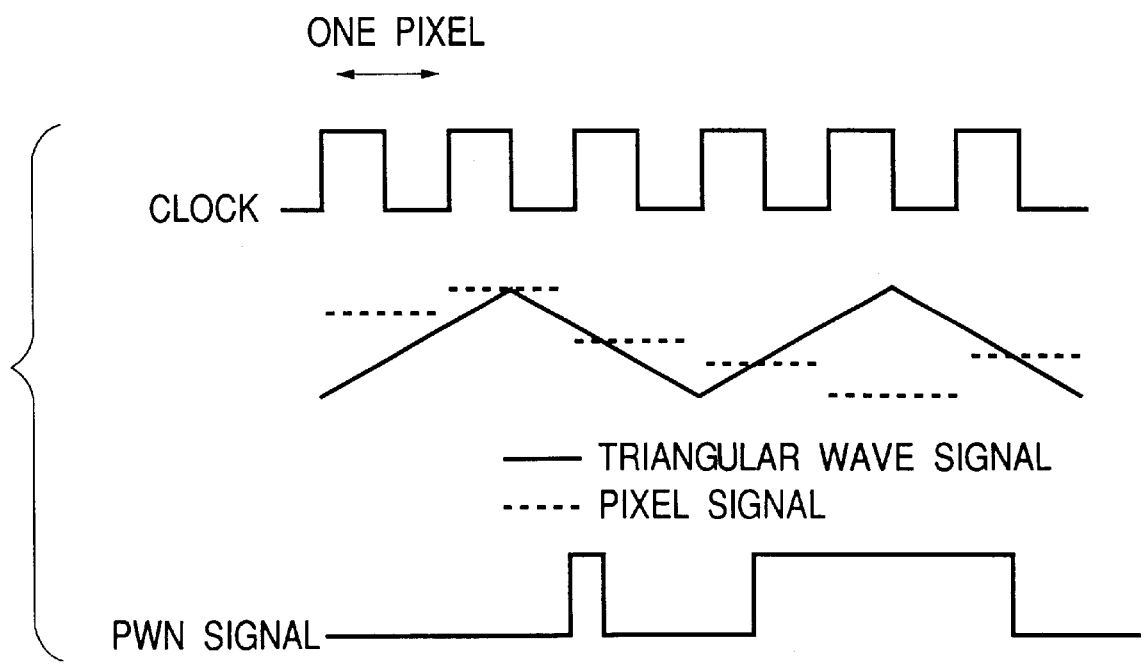
FIG. 11 is a waveform diagram showing the second example of a PWM modulation.
Figure 12:
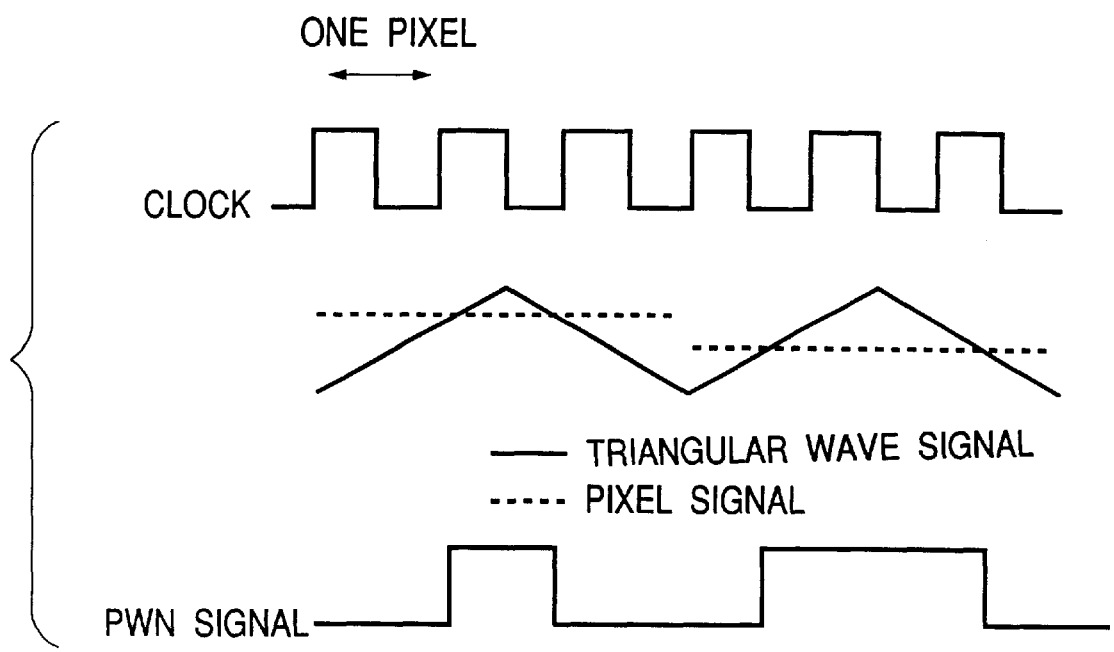
FIG. 12 is a waveform diagram showing the third example of a PWM modulation.
Figure 13:
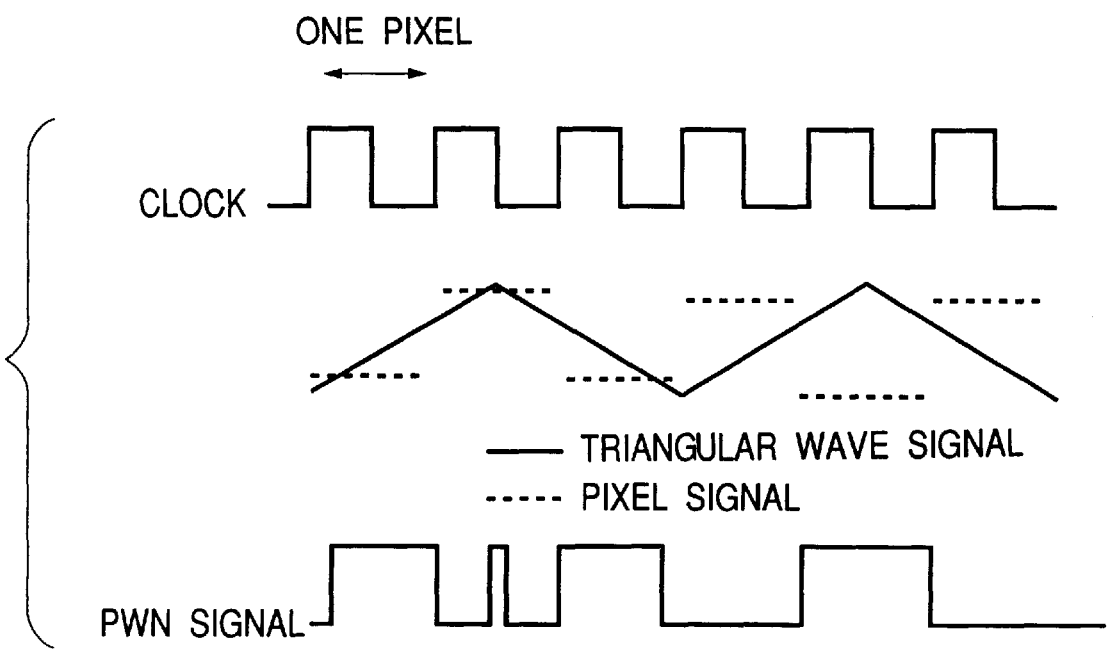
FIG. 13 is a waveform diagram showing the fourth example of a PWM modulation.

The second modulating method is a gradation priority mode. As shown in FIG. 11, the pixel data shown by 8 bits is D/A converted and sampled and held. The resultant data is compared with a triangular wave signal of a 3-pixel period and a PWM signal is outputted. Although FIG. 12 shows the modulating method in the case where a sampling and holding period and a period of the triangular wave signal are set to the 3-pixel period, a modulation signal of a low frequency and stable gradation characteristics are derived. According to the second modulating method, operation and effects similar to those shown in FIG. 12 are derived for the image data of a low frequency. However, as shown in FIG. 13, for a component of a large amplitude and a high frequency, there is further an operation for modulating with the component held.

Figure 14:
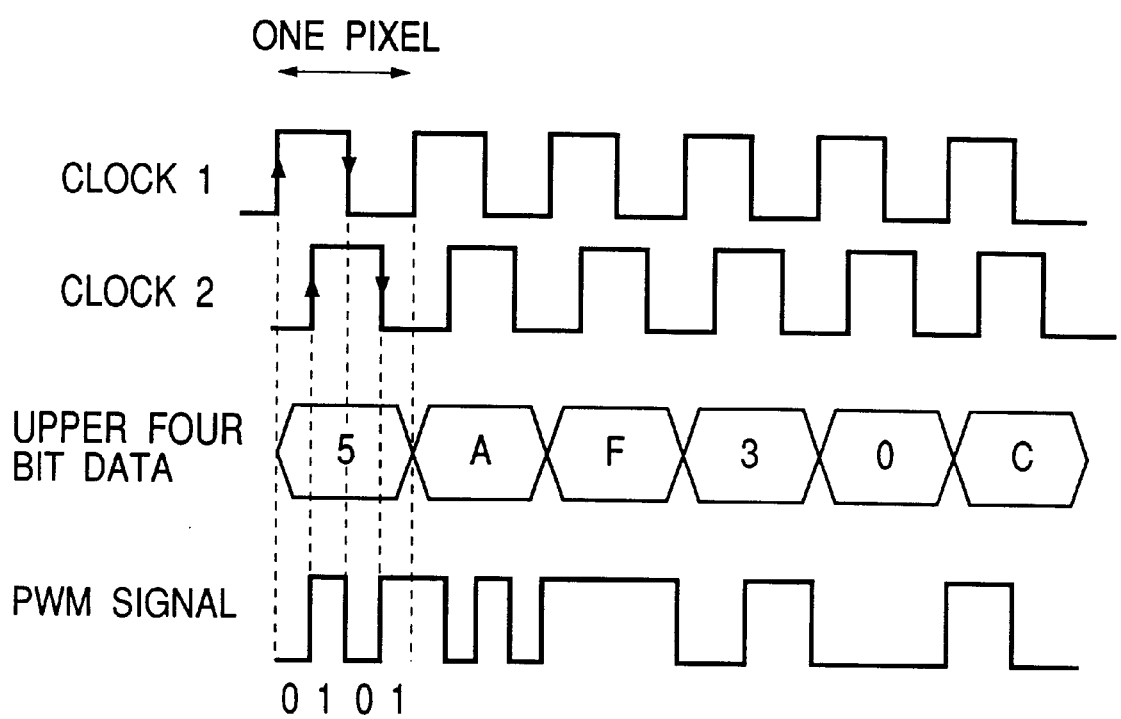
FIG. 14 is a waveform diagram showing the fifth example of a PWM modulation.

The third modulating method corresponds to a binary image mode. As shown in FIG. 14, a binary modulation signal in which one pixel is divided into ¼ pixels in the main scanning direction is outputted. The values of the 4-split small pixels are obtained by latching bit 7, bit 5, bit 6, and bit 4 of the pixel data by using a leading edge and a tailing edge of the first pixel clock and a leading edge and a trailing edge of the second pixel clock obtained by delaying the first pixel clock by a time of ¼ phase, respectively. According to the binarizing method of the embodiment, one small pixel is formed by a combination of (bit 7 and bit 6) and (bit 5 and bit 4), respectively, and the pixel values are used in a form in which one pixel is divided into two pixels in the main scanning direction.

A laser 250 generates a laser beam in accordance with an output of the PWM circuit 248. The timing generating circuit 254 and control signal generating circuit 256 are initialized by the CPU 252 at the stage before the scanning operation is started. The timing generating circuit 254 generates a timing signal necessary for each section of the system. The control signal generating circuit 256 operates as an extension port of the CPU 252 and generates a control signal necessary for each section of the system. A system address bus and a system data bus serving as buses of the CPU 252 are also connected to the connectors 218, 232, and 236. The CPU 252 controls circuit boards which are connected to the connectors 218, 232, and 236.

Reference numeral 258 denotes an operation display comprising the component elements shown in FIG. 4 and is used for a key input to the CPU 252 and a display of various information. The CPU 252 also controls the ADF 120 shown in FIG. 3 and a driving circuit to drive a polygon mirror.

Figure 15:
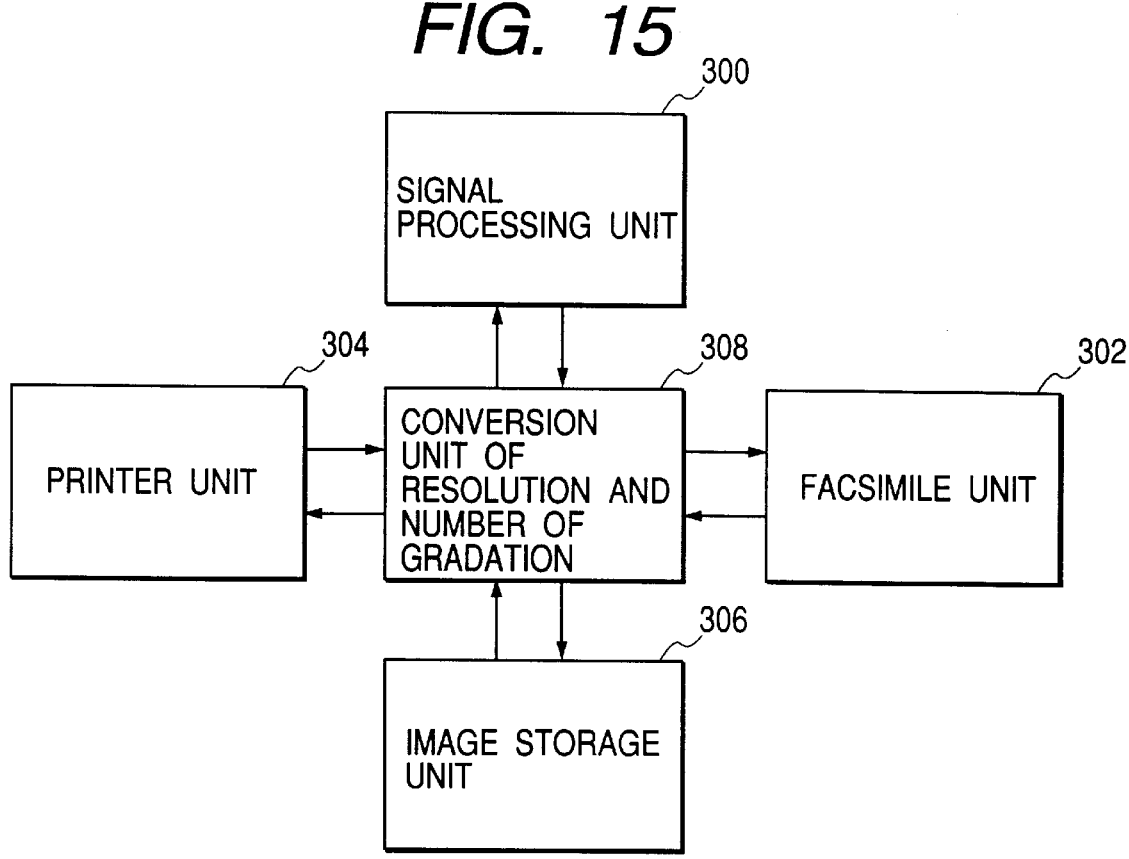
FIG. 15 is a schematic constructional block diagram of a system construction to which a facsimile function, a printer function, and an electronic sorter function are added.
Figure 16:
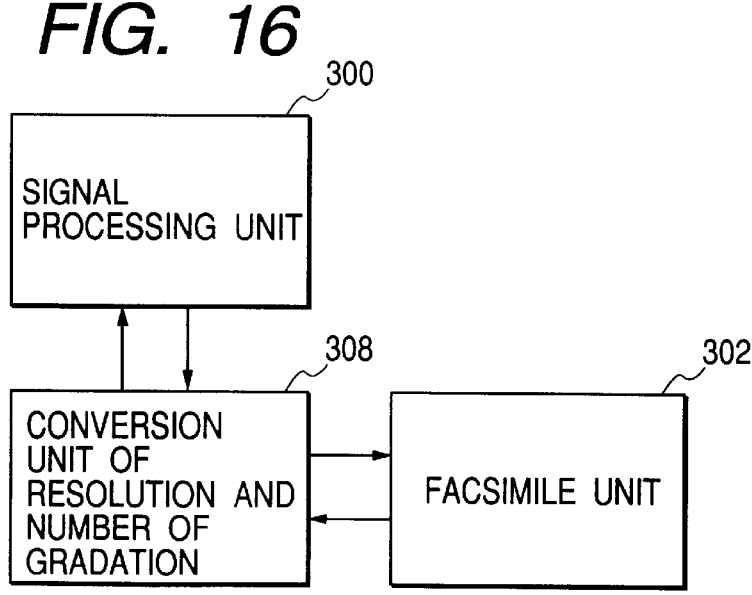
FIG. 16 is a schematic constructional block diagram of a system construction to which only the facsimile function is added.

FIG. 15 shows a schematic constructional block diagram of a system construction to which a facsimile function, a printer function, and an electronic sorter function are added to the basic copying function. FIG. 16 shows a schematic constructional block diagram of a system construction in which the FAX function is added to the basic copying function. In FIGS. 15 and 16, a signal processing unit 300 executes the processings regarding the basic copying function shown in FIG. 5. A facsimile unit 302, a printer unit 304, and an image storage unit 306 execute the processings regarding the FAX function, printer function, and electronic sorter function, respectively. The printer unit 304 is a function additional board for allowing the apparatus to operate as a printer of the computer. The image storage unit 306 further has external connectors and functions such as external scanner, electronic file, and the like can be added. Since a resolution and the number of gradations are different every function, a conversion unit 308 of resolution and number of gradation is provided to match the resolutions and the numbers of gradations among those functions and to convert an image to an optimum image quality. By connecting the conversion unit 308 of resolution and number of gradation to the signal processing unit 300, the system can be freely expanded as necessary. The conversion unit 308 is connected to the signal processing unit 300 by using the connector 236 shown in FIG. 5.

Each of the connectors to connect the conversion unit 308 of resolution and number of gradation to the signal processing unit 300, facsimile unit 302, printer unit 304, and image storage unit 306 includes terminals for the address bus and data bus of the system, the sync signal, pixel clock signal, interruption signal, and the like, respectively. Among them, the address bus and the data bus are buses of the CPU 252 in FIG. 5. The sync signal is generated from the timing generating circuit 254. The pixel clock signal is generated by an oscillator (not shown) of the signal processing unit 300. The interruption signal is prepared for transferring information indicative of a request of the processing, an end of the processing, generation of an error, and the like to the CPU 252 shown in FIG. 5 from the facsimile unit 302, printer unit 304, and image storage unit 306.

Figure 17:
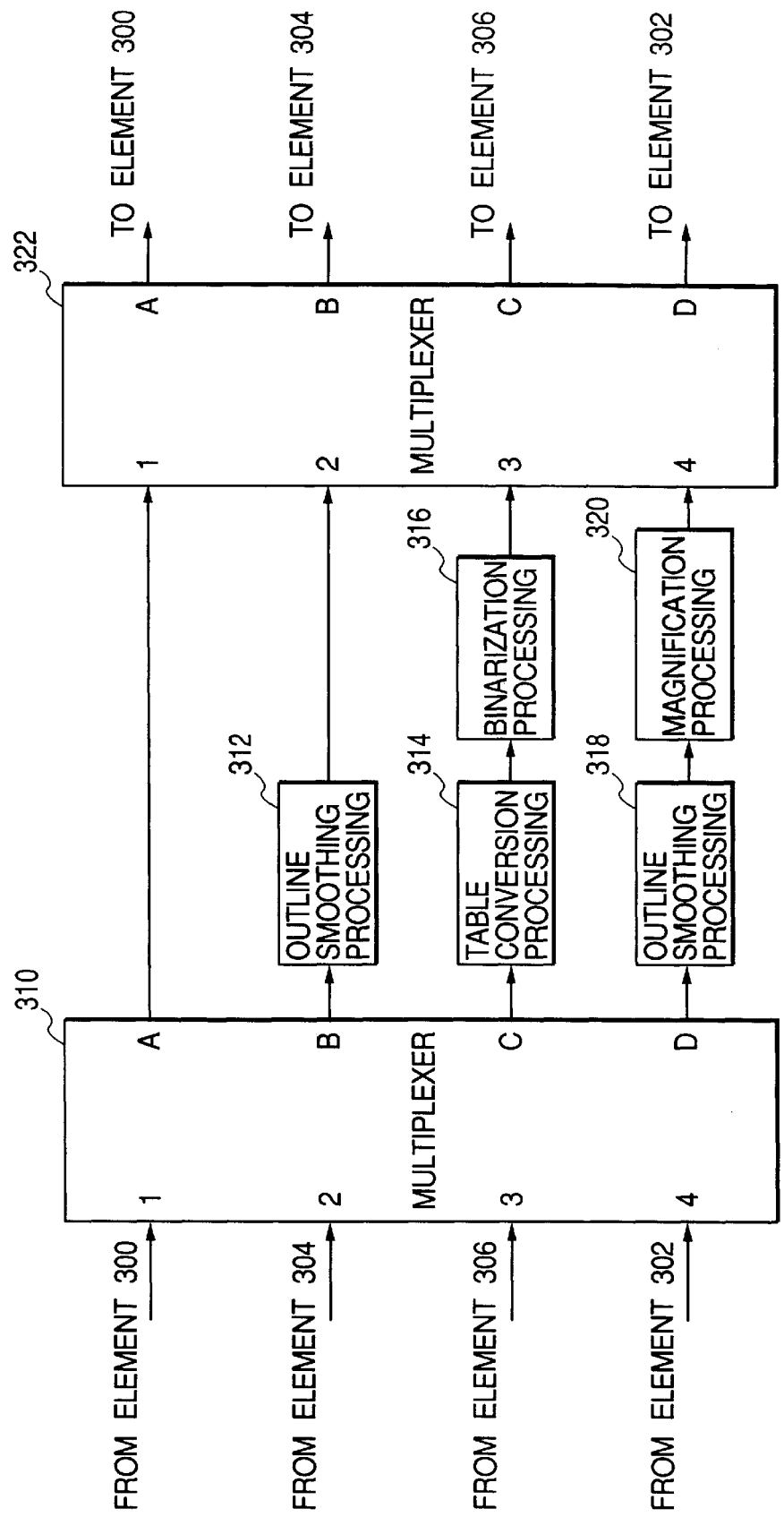
FIG. 17 is a schematic constructional block diagram of a conversion unit 308 of resolution and number of gradation.

FIG. 17 shows a schematic constructional block diagram of the conversion unit 308 of resolution and number of gradation. A multiplexer 310 distributes the output signals of the signal processing unit 300, facsimile unit 302, printer unit 304, and image storage unit 306 to first, second, third, and fourth signal paths, respectively. The first signal path is a through path. The second signal path is a path to execute a processing for allowing an outline of a curve to be seen as a smooth line to a binary image signal and to output. For a binary output from an output port B of the multiplexer 310, an outline smoothing processing circuit 312 allocates one bit to each of the four small pixels obtained by dividing one pixel in the main scanning direction and outputs the image signal by four bits per pixel.

The third signal path is a path to binarize a multivalue signal. A table conversion processing circuit 314 table converts the multiple signal from an output port C of the multiplexer 310. Further, a binarization processing circuit 316 binarizes an output of the table conversion processing circuit 314 by an average density method. In this instance, by allocating one bit to each of the two small pixels obtained by dividing one pixel in the main scanning direction, the image signal is outputted by two bits per pixel.

The fourth signal path is a path to perform the processing for allowing an outline of a curve to be seen as a smooth line to binary images of various resolutions and to output as a multivalue signal of 8 bits. An outline smoothing processing circuit 318 performs the processing for allowing an outline of a curve to be seen as a smooth line to a binary signal from an output port D of the multiplexer 310 and outputs an 8-bit multivalue signal. Further, a magnification processing circuit 320 linearly interpolates the multivalue output of the outline smoothing processing circuit 318 and outputs the 8-bit multivalue signal.

A multiplexer 322 distributes the signals from the first to fourth signal paths, namely, the signal from an output port A of the multiplexer 310, the output of the outline smoothing processing circuit 312, the output of the binarization processing circuit 316, and the output of the magnification processing circuit 320 to the signal processing unit 300, facsimile unit 302, printer unit 304, and image storage unit 306, respectively.

In the facsimile transmitting operation, the image signal is transferred from the signal processing unit 300 to the facsimile unit 302 through the conversion unit 308 of resolution and number of gradation. At this time, the multiplexer 310 connects an input port 1 to an output port C and the multiplexer 322 connects an input port 3 to an output port D. Thus, the image signal passes through the third signal path.

In the facsimile receiving operation, the received image signal is transferred from the facsimile unit 302 to the signal processing unit 300 through the conversion unit 308 of resolution and number of gradation. In this instance, the multiplexer 310 connects an input port 4 to the output port D and the multiplexer 322 connects an input port 4 to an output port A. Thus, the received image signal passes through the fourth signal path.

In the printing operation, the image signal is transferred from the printer unit 304 to the signal processing unit 300 via the conversion unit 308 of resolution and number of gradation. At this time, the multiplexer 310 connects an input port 2 to an output port B and the multiplexer 322 connects an input port 2 to the output port A. Thus, the image signal passes through the second signal path. In case of zooming the image to a different fixed paper size, the multiplexer 310 connects the input port 2 to the output port D and the multiplexer 322 connects the input port 4 to the output port A. Thus, the image signal passes through the fourth signal path.

When the electronic sorter function or the like is used, the image signal is transferred from the signal processing unit 300 to the image storage unit 306 through the conversion unit 308. In this instance, the multiplexer 310 connects the input port 1 to the output port A and the multiplexer 322 connects an input port 1 to the output port C. Thus, the image signal passes through the first signal path.

In case of sorting the image data in accordance with the reverse order and outputting in the printer function, the image signal is once transferred from the printer unit 304 to the image storage unit 306 through the conversion unit 308. In this instance, the multiplexer 310 connects the input port 2 to the output port A and the multiplexer 322 connects the input port 1 to the output port C, so that the image signal passes through the first signal path. The image storage unit 306 writes the inputted image signal into a built-in hard disk and reads out the signal in accordance with the order opposite to that upon writing. The read image signal is transferred from the image storage unit 306 to the signal processing unit 300 through the conversion unit 308. In this instance, the multiplexer 310 connects an input port 3 to the output port B and the multiplexer 322 connects the input port 2 to the output port A, so that the image signal passes through the second signal path.

Figure 18:
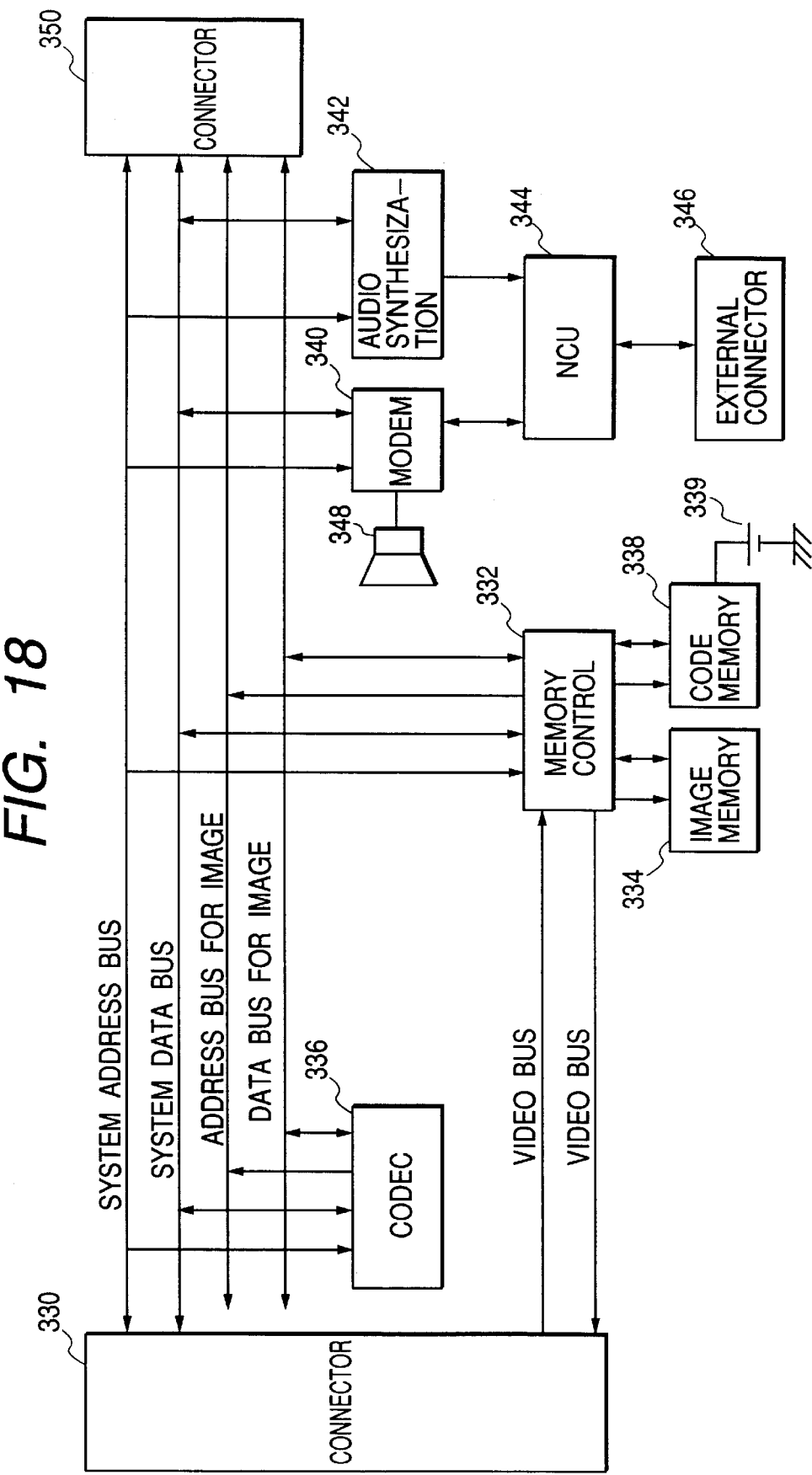
FIG. 18 is a schematic constructional block diagram of a facsimile unit 302.

FIG. 18 shows a schematic constructional block diagram of the facsimile unit 302. A connector 330 has terminals for the address bus and data bus of the system, the video input signal, video output signal, sync signal, pixel clock signal, interruption signal, and the like. The facsimile unit 302 is connected to the conversion unit 308 of resolution and number of gradation by the connector 330. In the facsimile transmitting operation, a memory control circuit 332 stores the video input signal from the connector 330 into an image memory 334.

An encode/decode processing circuit 336 has a DMA controller, fetches the image data from the image memory 334 at a high speed by a DMA transfer by the communication with the memory control circuit 332, encodes the fetched image data, and writes the encoded code into a code memory 338 by the DMA transfer. A power source is always supplied to the code memory 338 by a backup power source 339 in order to correspond to a power trouble such as a power failure or the like of the system.

The encode/decode processing circuit 336, memory control circuit 332, a modem 340, and an audio synthesization circuit 342 which are connected to the address bus and data bus of the system are connected to the CPU 252 through the connector 330 and are controlled by the CPU 252.

When the encoding of the image data which is stored in the image memory 334 is finished, the encode/decode processing circuit 336 generates an interruption signal to notify the CPU 252 of the end of the encoding. The CPU 252 which received the interruption signal reads out the code data from the code memory 338 through the memory control circuit 332 and writes as transmission data into the modem 340. The transmission data is modulated into an analog signal by the modem 340. The transmission data is modulated to an analog signal by the modem 340 and is transmitted to the outside through an NCU (network control unit) 344 and an external connector 346. A communicating state of the modem 340 can be monitored by a sound by a speaker 348 connected to the modem 340.

In the facsimile receiving operation, a facsimile signal from the outside is inputted to the modem 340 through the external connector 346 and NCU 344. When the signal is received from the NCU 344, the modem 340 generates an interruption signal to notify the CPU 252 of the data reception. The CPU 252 which received the interruption signal reads out the reception data from the modem 340 and writes into the code memory 338 through the memory control circuit 332. When the writing operation to the code memory 338 is finished, the CPU 252 notifies the encode/decode processing circuit 336 of the end of the writing operation via the buses of the system. The encode/decode processing circuit 336 fetches the code data from the code memory 338 at a high speed by the DMA transfer by communicating with the memory control circuit 332 and decodes and writes the decoded image data into the image memory 334 by the DMA transfer. When the decoding of the code stored in the code memory 338 is finished, the encode/decode processing circuit 336 generates an interruption signal to notify the CPU 252 of the end of the decoding.

The memory control circuit 332 reads out the image data from the image memory 334 in accordance with a timing signal from the connector 330 and supplies to the connector 330. The memory control circuit 332 has a function to rotate the image that is stored into the image memory 334 by an angle of 90°, 180°, and 270° by using an internal buffer memory and rotates the reception image or transmission image as necessary.

The audio synthesization circuit 342 synthesizes a response message by a sound upon reception on the basis of the data set through the buses of the system. The response message is transmitted to the outside through the NCU 344. A connector 350 to which the buses of the system and the buses of the image are connected is prepared for preparation of expansion of the system in order to extend lines and to improve the performance.

Figure 19:
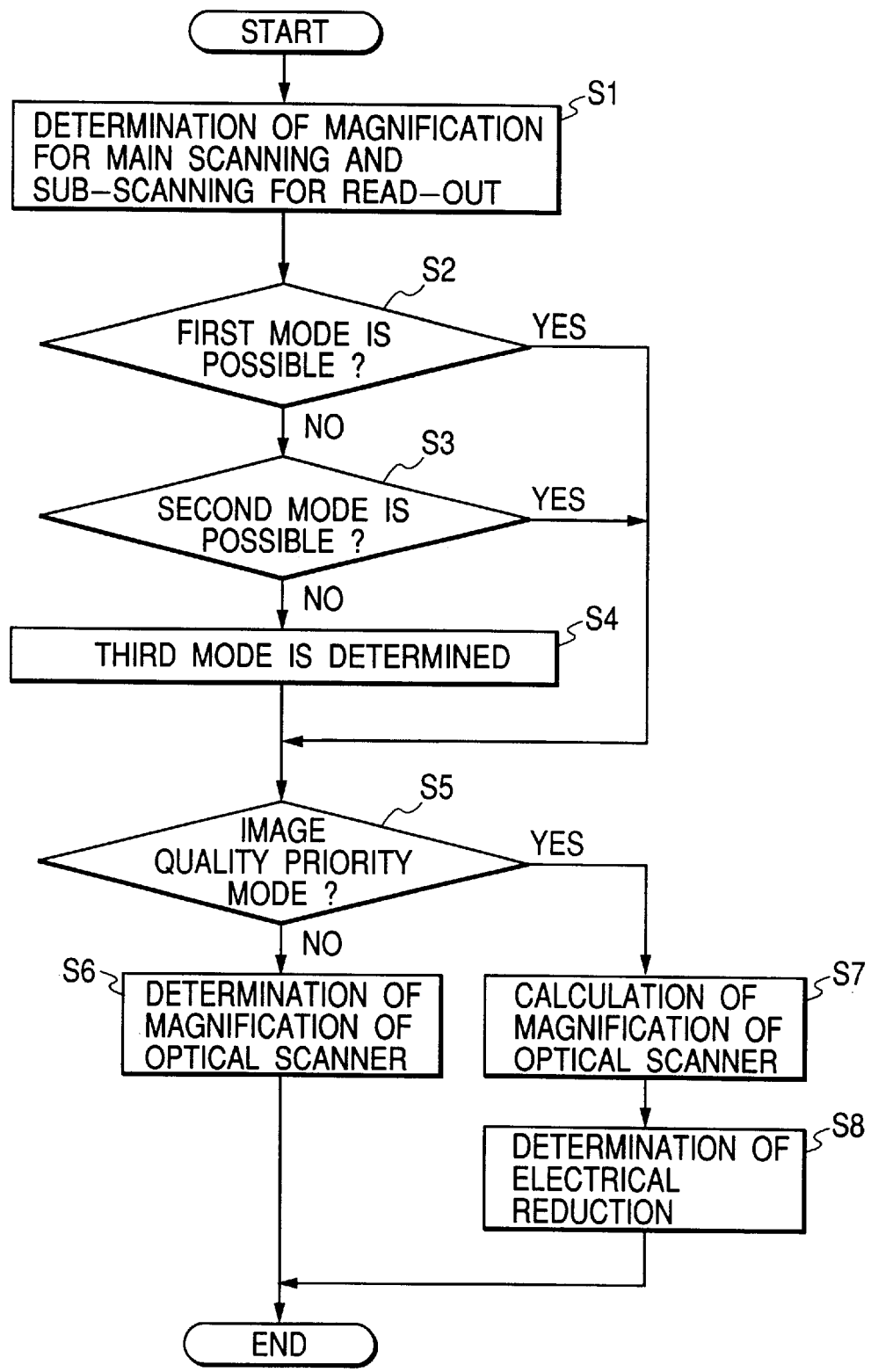
FIG. 19 is a flowchart for automatically discriminating a sub-scanning magnification mode.

The most characteristic operation of the embodiment will now be described. FIG. 19 shows a flowchart for deciding an operating speed and a resolution of the optical scanner upon reading of the original by the facsimile and an electrical reduction magnification in the conversion unit 308 of resolution and number of gradation. Operation controls shown in flowcharts of FIGS. 19 to 21, which will be explained hereinbelow, are executed by the CPU 252. It is now assumed that the reduction by a speed change of the optical scanner is labeled as a first magnification mode, the electrical reduction in the conversion unit 308 of resolution and number of gradation is labeled as a second magnification mode, and a magnification mode by a combination of the first and second magnification modes is labeled as a third magnification mode.

In the embodiment, explanation will now be made with respect to the case of reading an original by a scanner having ability such that the maximum resolution of each of the main scan and the sub-scan is equal to 600 dpi and it is possible to reduce to 6.75 dpi (corresponding to 50 dpi) in the main scan, to a reduction magnification of 25% (¼ reduction of the original length and corresponding to 125 dpi) in the sub-scan by changing the operating speed of the optical scanner, and to an electrical reduction magnification of 25% (corresponding to 125 dpi).

First, a case of automatically selecting the mode will now be described. In the case where an original of A4R in which the resolution is normal (7.75×3.75), namely, an A4 original is read so that the major side is set to the sub-scanning direction under the reading conditions set by the touch panel 202, reading reduction magnifications in the main scan and the subscan are calculated from the resolution and the original size (step S1). That is, the numbers of pixels which are necessary in the main scanning direction and the sub-scanning direction are calculated. In the facsimile, since the number of pixels in the main scanning direction of the image on a communication line is equal to 1728 dots, it is necessary to reduce to 32.8% in the main scanning direction and to 16.4% in the sub-scanning direction. The reduction in the main scanning direction is performed in the magnification processing circuit 222 by using the SRAM memory 224. Subsequently, the operating mode in the sub-scanning direction is determined. In this instance, in which one of the foregoing first to third modes the reduction processing is executed is determined in accordance with the calculated reduction magnification. The reduction in the sub-scanning direction can be accomplished up to the reduction magnification of 25% which can be made correspond by changing the operating speed of the optical scanner and can be also accomplished up to 25% which can be made correspond by the electrical process. Therefore, the reduction magnification of 16.4% cannot be realized in both of the first and second magnification modes (S2, S3). Therefore, the third magnification mode is selected (S4).

When the magnification mode is set, a reading mode inputted by the touch panel 202 is referred (S5). When a character image mode is set, the priority is given to reading mode over the image quality. That is, the optical scanner is made operative at a relatively high operating speed so as to obtain the reduction magnification of 32.8(=16.4×2)% (S6). The electrical reduction is set to ½ (=50%). With this method, a desired magnification (namely, reduction magnification of 16.4%) can be realized. When a photograph mode is set in the original of the same resolution and same size (S5), the image is read in the third mode and the priority is given to the image quality. That is, the optical scanner is made operative at an operating speed lower than that in the character image mode so as to obtain the reduction magnification of 65.4(=16.4×4)% (S7). An electrical reduction magnification is set to ¼ (=25%) (S8). Thus, the image can be read at the reduction magnification of 16.4% as a desired magnification by giving the priority to the image quality. In this manner, by raising the mechanical scanning speed, the fluctuation of the image due to the vibration of the motor can be minimized by changing the magnification by the electrical processing without changing the magnification. Thus, the high image quality of the read image can be accomplished.

A case of reading the A4 original in a fine mode will now be described. A resolution in the fine mode is equal to 7.75(pel)×7.75(pel) and the number of pixels in the reading main scanning direction on the facsimile communication line is equal to 1728 dots, so that the reduction magnification of 32.8% can be realized. A reduction magnification in the subscanning direction is equal to 32.8% and the reduction magnification which can be made correspond by changing the operating speed of the optical scanner is equal to up to 25%, so that the first magnification mode can be realized (S2). The reading mode inputted by the touch panel 202 is referred (S5). In case of the character image (binary image) mode, since the priority is given to the speed over the image quality, the optical scanner is made operative in the first magnification mode at the operating speed corresponding to the reduction magnification of 32.8% (S6). When the photograph (multivalue image) mode is set in the original of the same resolution and same size (S5), by reading in the third magnification mode, the priority is given to the image quality. That is, the optical scanner is made operative at a low speed corresponding to the reduction magnification of 65.4(=32.8×2)% (S7) and the electrical reduction magnification is set to ½(=50%) (S8). Thus, the image can be read at the reduction magnification of 32.8% as a desired magnification while giving the priority to the image quality.

A set magnification can be also set to a fixed value in any one of the first to third magnification modes.

In the facsimile reading set inputted by the touch panel 202, when the reading mode of the original of A4R having the normal resolution (7.75×3.75) is inputted, the reading reduction magnifications (the numbers of pixels) in the main scanning direction and the subscanning direction are first calculated by the resolution and the original size. Since the number of pixels in the main scanning direction of the image on the communication line of the facsimile is equal to 1728 dots, it is necessary to reduce into 32.8% in the main scanning direction and to reduce into 16.4% in the sub-scanning direction.

Figure 20:
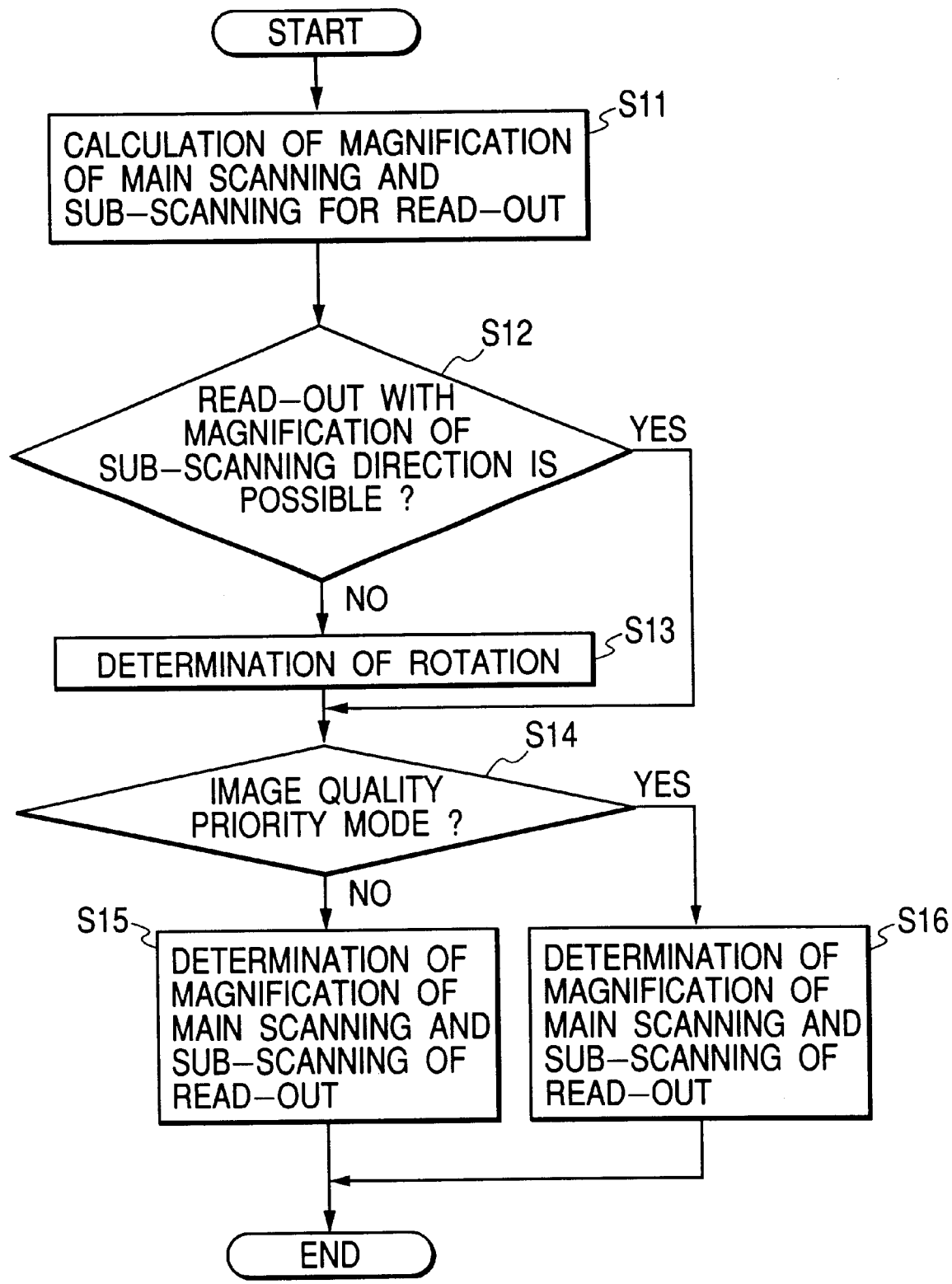
FIG. 20 is a flowchart in case of fixing the first mode and fixing the second mode.
Figure 21:
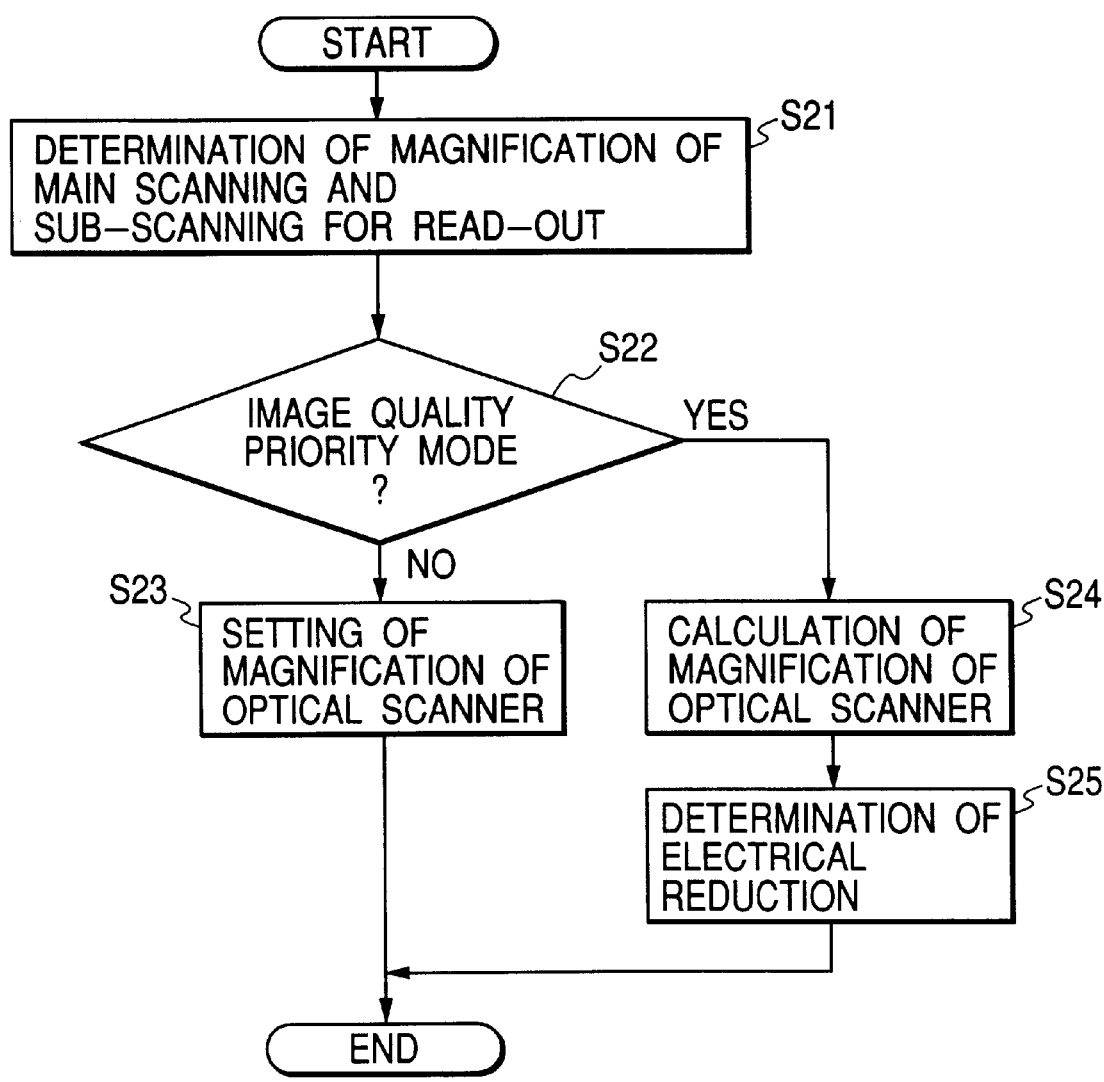
FIG. 21 is a flowchart in case of fixing the third mode.

The operation in case of preliminarily designating that the image is read in any one of the first to third magnification modes will now be described. FIG. 20 shows a flowchart in case of designating the first or second magnification mode. FIG. 21 shows a flowchart in case of designating the third magnification mode.

A case where the first magnification mode has been designated will now be described. When the first magnification mode is designated, since the reduction magnification of 16.4% in the sub-scanning direction is smaller than 25% which can be made correspond by changing the scanning speed of the optical scanner, it is impossible to correspond (S11, S12). Therefore, by rotating the original image by 90° upon reading, the vertical and lateral directions of the original image are reversed. The image is read at reduction magnifications of 16.4% in the main scanning direction and 32.89% in the sub-scanning direction (S13). The reduction in the main scanning direction is performed in the magnification processing circuit 222 by using the SRAM memory 224. When reducing in the sub-scanning direction, the reading mode inputted by the touch panel 202 is referred (S14). When the character image mode is set, since the priority is given to the reading speed over the image quality, the operating speed of the optical scanner is set to a speed corresponding to the reduction magnification of 32.8% (S15). The reading operation at a desired magnification can be realized. Even when the photograph mode is set (S14), since the first magnification mode is designated, the optical scanner is made operative at a speed corresponding to the reduction magnification of 32.8%. Thus, the image can be read at a desired magnification.

In case of reading the A4 original in the fine mode, since the resolution of the fine mode is equal to (7.75×7.75) and the number of pixels in the reading main scanning direction on the facsimile communication line is equal to 1728 dots. Therefore, it is necessary to reduce to 32.8%. The reduction magnification in the sub-scanning direction is equal to 32.8%. Since the reduction magnification of up to 25% can be realized by changing the operating speed of the optical scanner, the reduction can be realized in the first magnification mode. The reading mode inputted by the touch panel 202 is referred. In case of the character image mode, since the priority is given to the speed over the image quality, the optical scanner is made operative in the first magnification mode at the operating speed corresponding to the reduction magnification of 32.8%. Even when the photograph mode is set, since the first magnification mode has been designated, the image is read at the operating speed corresponding to the reduction magnification of 32.8%. Thus, the image can be read at a desired magnification.

A case where the second magnification mode has been designated will now be described. When the second magnification mode is designated, since the reduction magnification of 16.4% in the sub-scanning direction is smaller than the reduction magnification of 25% which can be made correspond by the electrical processing (S11, S12), the original image is rotated by 90° upon reading and the vertical and lateral positions of the original image are reversed (S13). By the rotation of 90°, the image is read at the reduction magnifications of 16.4% in the main scanning direction and 32.8% in the sub-scanning direction. The reduction in the main scanning direction is performed in the magnification processing circuit 222 by using the SRAM memory 224. When reducing in the sub-scanning direction, the reading mode inputted by the touch panel 202 is referred (S14). The magnification is controlled so as to reduce to 32.8% in the sub-scanning direction by the electrical zoom processing even in case of the character image mode or even in case of the photograph mode (S15, S16).

In case of reading the A4 original in the fine mode, since the resolution of the fine mode is equal to (7.75×7.75) and the number of pixels in the reading main scanning direction on the facsimile communication line is equal to 1728 dots, it is necessary to reduce to 32.8%. It is also necessary to reduce to 32.8% in the sub-scanning direction. Since the reduction magnification which can be electrically reduced is up to 25%, the reduction can be realized in the second magnification mode. The reduction in the main scanning direction is executed in the magnification processing circuit 222 by using the SRAM memory 224. When zooming in the sub-scanning direction, the reading mode inputted by the touch panel 202 is referred. However, since the second magnification mode has been designated here, even in the character image mode or even in the photograph mode, the image is reduced to 32.8% in the magnification processing circuit 222 by using the SRAM 224.

A case where the third magnification mode has been designated will now be described with reference to FIG. 21. In the case where the facsimile reading mode inputted by the touch panel 202 is set and the resolution is normal (7.75× 3.75) and the reading operation of the A4R is set, the reading reduction magnifications (the numbers of pixels) in the main scanning direction and the sub-scanning direction are first calculated by the resolution and the original size (S21). Since the number of pixels of the facsimile signal in the main scanning direction of the image on the communication line is equal to 1728 dots, it is necessary to reduce into 32.8% in the main scanning direction and to reduce into 16.4% in the sub-scanning direction. The reduction in the main scanning direction is performed in the magnification processing circuit 222 by using the SRAM memory 224. In case of reducing in the sub-scanning direction, the reading mode inputted by the touch panel 202 is referred (S22). When the inputted reading mode is the character image (binary image) mode, the priority is given to the reading speed over the image quality and the optical scanner is made operative at an operating speed corresponding to the reduction magnification of 32.8(=16.4×2)% (S23). The electrical reduction magnification is set to ½(=50%). Thus, the reduction magnification of 16.4% as a desired magnification can be realized. When the photograph (multivalue image) mode is selected (S22), since the priority is given to the image quality, the optical scanner is made operative at a speed lower than that in the character image mode so as to obtain the reduction magnification of 65.6(=16.4×4)% (S24). The electrical reduction magnification is set into ¼(=25%) (S25). Thus, the reduction magnification of 16.4% as a desired magnification can be set and the image can be read while giving the priority to the image quality.

In the case where the third magnification mode is designated and the A4 original is read in the fine mode, since the resolution of the fine mode is equal to (7.75×7.75) and the number of pixels of the facsimile signal in the reading main scanning direction on the communication line is equal to 1728 dots, it is necessary to reduce to 32.8% in the main scanning direction and to also reduce to 32.8% in the subscanning direction (S21). Since the third magnification mode is fixed, the optical scanner is made operative at the operating speed corresponding to the reduction magnification of 65.6% and the electrical reduction magnification is set to ½(=50 %). The zoom in the main scanning direction is performed by the magnification processing circuit 222. When performing the zoom in the sub-scanning direction, the reading mode inputted by the touch panel 202 is referred (S22). In case of the character image mode, since the priority is given to the speed over the image quality, the optical scanner is made operative at the operating speed corresponding to the reduction magnification of 65.6% and the image is further electrically reduced into ½(=50%). In case of the photograph mode (S22), since the priority is given to the image quality, the optical scanner is made operative at a speed lower than that in the character image mode so as to obtain the magnification of 131.4(=32.8×4)% (S24). The electrical reduction magnification is set into ¼(=50%) (S25). Thus, the reduction magnification of 32.8% as a desired magnification can be set and the image can be read while giving the priority to the image quality.

Although the invention has been described above with respect to the example of the original reading operation in the facsimile, the invention is not limited to the facsimile function. The invention can be also obviously applied to a general equipment for reading an original so long as it has a construction similar to that mentioned above.

As will be easily understood from the above description, by combining the change in optical reading speed and the electrical enlargement and reduction processing, the image can be properly read according to the setting of the reading mode. Even in the case where the magnification mode has been preset, a proper image can be read. Since there is no need to set an approach run distance of the optical reading to a long distance and the equipment can be miniaturized. Further, there is no need to use an expensive optical reading motor and the costs can be reduced.

Many widely defferent embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   (A) reading means for reading an original image;
   (B) first magnifying means for changing a reading magnification of said reading means;
   (C) second magnifying means for changing the reading magnification of said reading means by a method different from that in said first magnifying means; and
   (D) selecting means for selecting either one of said first and second magnifying means in accordance with whether a priority is given to an image quality or a Priority is given to a reading time.

2. A apparatus according to claim 1, wherein said selecting means selects either one of a first mode using said first magnifying means and a second mode using said second magnifying means.

3. An apparatus according to claim 1, wherein said selecting means selects either one of a first mode using only said first magnifying means and a second mode using said first and second magnifying means.

4. An apparatus according to claim 1, wherein said selecting means selects either one of a first mode using only said second magnifying means and a second mode using said first and second magnifying means.

5. An apparatus according to claim 1, further comprising control means for controlling said reading means so as to read said original image by using the magnifying means selected by said selecting means.

6. An apparatus according to claim 1, further comprising setting means for setting a resolution and calculating means for calculating a magnification in accordance with said resolution.

7. An apparatus according to claim 1, further comprising setting means for setting said original size and calculating means for calculating a magnification in accordance with original size.

8. An apparatus according to claim 1, wherein said first magnifying means optically changes the reading magnification of said reading means and said second magnifying means changes the reading magnification of said reading means by electrically processing the image signal which is outputter from said reading means.

9. An apparatus according to claim 8, wherein said selecting means selects either one of a first mode using said first magnifying means and a second mode using said second magnifying means.

10. AN apparatus according to claim 8, wherein said selecting means selects either one of a first mode using only said first magnifying means and a second mode using said first and second magnifying means.

11. An apparatus according to claim 8, wherein said selecting means selects either one of a first mode using only said second magnifying means and a second mode using said first and second magnifying means.

12. An apparatus according to claim 8, further comprising control means for controlling said reading means so as to read said original image by using the magnifying means selected by said selecting means.

13. An apparatus according to claim 1, further comprising deviating means for changing a relative position between said original image and said reading means.

14. A apparatus according to claim 13, wherein said first magnifying means changes the reading magnification of said reading means by changing a deviating speed by said deviating means, and said second magnifying means changes the reading magnification of said reading means by electrically processing the image signal which is outputted from said reading means.

15. An apparatus according to claim 14, wherein said selecting means selects either one of a first mode using said first magnifying means and a second mode using said second magnifying means.

16. An apparatus according to claim 14, wherein said selecting means selects either one of a first mode using only said first magnifying means and a second mode using said first and second magnifying means.

17. An apparatus according to claim 14, wherein said selecting means selects either one of a first mode using only said second magnifying means and a second mode using said first and second magnifying means.

18. An apparatus according to claim 14, further comprising control means for controlling said reading means so as to read said original image by using the magnifying means selected by said selecting means.

19. An image reading apparatus comprising:
(A) reading means for reading an original image;
(B) first density converting means for changing a reading pixel density per unit area of said reading means;
(C) second density converting means for changing the reading pixel density per unit area of said reading means by a method different from that in said first density converting means; and
(D) selecting means for selecting either one of said first and second density converting means in accordance with whether a priority is given to an image quality or a priority is given to a reading time.

20. An apparatus according to claim 19, wherein said selecting means selects either one of a first mode using said first density converting means and a second mode using said second density converting means.

21. An apparatus according to claim 19, wherein said selecting means selects either one of a first mode using only said first density converting means and a second mode using said first and second density converting means.

22. An apparatus according to claim 19, wherein said selecting means selects either one of a first mode using only said second density converting means and a second mode using said first and second density converting means.

23. An apparatus according to claim 19, further comprising control means for controlling said reading means so as to read said original image by using the density converting means selected by said selecting means.

24. An apparatus according to claim 19, further comprising setting means for setting a resolution and calculating means for calculating the number of pixels in accordance with said resolution.

25. An apparatus according to claim 19, further comprising setting means for setting said original size and calculating means for calculating the number of pixels in accordance with original size.

26. An apparatus according to claim 19, wherein said first density converting means optically changes the reading pixel density of said reading means and said second density converting means changes the reading pixel density of said reading means by electrically processing the image signal which is outputted from said reading means.

27. An apparatus according to claim 26, wherein said selecting means selects either one of a first mode using said first density converting means and a second mode using said second density converting means.

28. An apparatus according to claim 26, wherein said selecting means selects either one of a first mode using only said first density converting means and a second mode using said first and second density converting means.

29. An apparatus according to claim 26, wherein said selecting means selects either one of a first mode using only said second density converting means and a second mode using said first and second density converting means.

30. An apparatus according to claim 26, further comprising control means for controlling said reading means so as to read said original image by using the density converting means selected by said selecting means.

31. An apparatus according to claim 19, further comprising deviating means for changing a relative position between said original image and said reading means.

32. An apparatus according to claim 31, wherein said first density converting means changes the reading pixel density per unit area of said reading means by changing a deviating speed by said deviating means, and said second density converting means changes the reading pixel density per unit area of said reading means by electrically processing the image signal which is outputted from said reading means.

33. An apparatus according to claim 32, wherein said selecting means selects either one of a first mode using said first density converting means and a second mode using said second density converting means.

34. An apparatus according to claim 32, wherein said selecting means selects either one of a first mode using only said first density converting means and a second mode using said first and second density converting means.

35. An apparatus according to claim 32, wherein said selecting means selects either one of a first mode using only said second density converting means and a second mode using said first and second density converting means.

36. An apparatus according to claim 32, further comprising control means for controlling said reading means so as to read said original image by using the density converting means selected by said selecting means.

37. An image reading method comprising:
(A) a reading step of reading an original image;
(B) a first magnifying step of changing a reading magnification of said reading step;
(C) a second magnifying step of changing the reading magnification of said reading step by a method different from that in said first magnifying step; and
(D) a selecting step of selecting either one of said first and second magnifying steps in accordance with whether a priority is given to an image quality or a priority is given to a reading time.

38. A method according to claim 37, wherein in said selecting step, either one of a first mode using said first magnifying step and a second mode using said second magnifying step is selected.

39. A method according to claim 37, wherein in said selecting step, either one of a first mode using only said first magnifying step and a second mode using said first and second magnifying steps is selected.

40. A method according to claim 37, wherein in said selecting step, either one of a first mode using only said second magnifying step and a second mode using said first and second magnifying steps is selected.

41. A method according to claim 37, further comprising a control step of controlling said reading step so as to read said original image by using the magnifying step selected by said selecting step.

42. A method according to claim 37, further comprising a setting step of setting a resolution and a calculating step of calculating a magnification in accordance with said resolution.

43. A method according to claim 37, further comprising a setting step of setting said original size and a calculating step of calculating a magnification in accordance with said original size.

44. A method according to claim 37, wherein in said first magnifying step, the reading magnification of said reading step is optically changed and, in said second magnifying step, the reading magnification of said reading step is changed by electrically processing the image signal which is outputted from said reading step.

45. A method according to claim 44, wherein said selecting step, either one of a first mode using said first magnifying step and a second mode using said second magnifying step is selected.

46. A method according to claim 44, wherein in said selecting step, either one of a first mode using only said first magnifying step and a second mode using said first and second magnifying steps is selected.

47. A method according to claim 44, wherein in said selecting step, either one of a first mode using only said second magnifying step and a second mode using said first and second magnifying steps is selected.

48. A method according to claim 44, further comprising a control step of controlling said reading step so as to read said original image by using the magnifying step selected by said selecting step.

49. A method according to claim 37, further comprising a deviating step of changing a relative position between said original image and reading means for reading said original image.

50. A method according to claim 49, wherein in said first magnifying step, the reading magnification of said reading step is changed by changing a deviating speed by said deviating step, and in said second magnifying step, the reading magnification of said reading step is changed by electrically processing the image signal which is outputted from said reading step.

51. A method according to claim 50, wherein in said selecting step, wither one of a first mode using said first magnifying step and a second mode using said second magnifying step is selected.

52. A method according to claim 50, wherein said selecting step, wither one of a first mode using only said first magnifying step and a second mode using said first and second magnifying steps is selected.

53. A method according to claim 50, wherein in said selecting step, wither one of a first mode using only said second magnifying step and a second mode using said first and second magnifying steps is selected.

54. A method according to claim 50, further comprising a control step of controlling said reading step so as to read said original image by using the magnifying step selected by said selecting step.

55. An image reading method comprising:
(A) a reading step of reading an original image;
(B) a first density converting step of changing a reading pixel density per unit area of said reading step;
(C) a second density converting step of changing the reading pixel density per unit area of said reading step by a method different from that in said first density converting step; and
(D) a selecting step of selecting either one of said first and second density converting steps in accordance with whether a priority is given to an image quality or a priority is given to a reading time.

56. A method according to claim 55, wherein in said selecting step, either one of a first mode using said first density converting step and a second mode using said second density converting step is selected.

57. A method according to claim 55, wherein in said selecting step, either one of a first mode using only said first density converting step and a second mode using said first and second density converting steps is selected.

58. A method according to claim 55, wherein in said selecting step, either one of a first mode using only said second density converting step and a second mode using said first and second density converting steps is selected.

59. A method according to claim 55, further comprising a control step of controlling said reading step so as to read said original image by using the density converting step selected by said selecting step.

60. A method according to claim 5, further comprising a setting step of setting a resolution and a calculating step of calculating the number of pixels in accordance with said resolution.

61. A method according to claim 55, further comprising a setting step of setting said original size and a calculating step of calculating the number of pixels in accordance with said original size.

62. A method according to claim 55, wherein in Said first density converting step, the reading pixel density of said reading step is optically changed and, in said second density converting step, the reading pixel density of said reading step is changed by electrically processing the image signal which is outputted from said reading step.

63. A method according to claim 62, wherein in said selecting step, either one of a first mode using said first density converting step and a second mode using said second density converting step is selected.

64. A method according to claim 62, wherein in said selecting step, either one of a first mode using only said first density converting step and a second mode using said first and second density converting steps is selected.

65. A method according to claim 62, wherein in said selecting step, either one of a first mode using only said second density converting step and a second mode using said first and second density converting steps is selected.

66. A method according to claim 62, further comprising a control step of controlling said reading step so as to read said original image by using the density converting step selected by said selecting step.

67. A method according to claim 55, further comprising a deviating step of changing a relative position between said original image and reading means for reading said original image.

68. A method according to claim 67, wherein in said first density converting step, the reading pixel density per unit area of said reading step is changed by changing a deviating speed by said deviating step, and in said second density converting step, the reading pixel density per unit area of said reading step is changed by electrically processing the image signal which is outputted from said reading step.

69. A method according to claim 68, wherein in said selecting step, either one of a first mode using said first density converting step and a second mode using said second density converting step is selected.

70. A method according to claim 68, wherein in said selecting step, either one of a first mode using only said first density converting step and a second mode using said first and second density converting steps is selected.

71. A method according to claim 68, wherein in said selecting step, either one of a first mode using only said second density converting step and a second mode using said first and second density converting steps is selected.

72. A method according to claim 68, further comprising a control step of controlling said reading step so as to read said original image by using the density converting step selected by said selecting step.

* * * * *

UNITED STATES PATENT AND TRADEMARK OFFICE
CERTIFICATE OF CORRECTION

PATENT NO. : 6,271,933 B1
APPLICATION NO. : 09/017293
DATED : August 7, 2001
INVENTOR(S) : Hidehiko Asai et al.

It is certified that error appears in the above-identified patent and that said Letters Patent is hereby corrected as shown below:

COLUMN 5

Line 66, "be" should be deleted.

COLUMN 6

Line 16, "on" (first occurrence) should be deleted;
Line 33, "on" should be deleted;
Line 35, "on" should be deleted;
Line 36, "on" should be deleted; and
Line 39, "on" should be deleted.

COLUMN 18

Line 16, "defferent" should read --different--;
Line 33, "Priority" should read --priority--; and
Line 57, "original size," should read --said original size,--.

COLUMN 20

Line 6, "original size." should read --said original size.--.

COLUMN 21

Line 57, "wither" should read --either--;
Line 61, "wither" should read --either--; and
Line 65, "wither" should read --either--.

UNITED STATES PATENT AND TRADEMARK OFFICE
CERTIFICATE OF CORRECTION

PATENT NO. : 6,271,933 B1
APPLICATION NO. : 09/017293
DATED : August 7, 2001
INVENTOR(S) : Hidehiko Asai et al.

It is certified that error appears in the above-identified patent and that said Letters Patent is hereby corrected as shown below:

COLUMN 22

Line 32, "claim 5," should read --claim 55,--; and
Line 40, "Siad" should read --said--.

Signed and Sealed this

Fourth Day of September, 2007

JON W. DUDAS
*Director of the United States Patent and Trademark Office*